United States Patent
Rosheim

(10) Patent No.: US 12,385,597 B2
(45) Date of Patent: Aug. 12, 2025

(54) GIMBAL ASSEMBLY

(71) Applicant: ROSS-HIME DESIGNS, INCORPORATED, Vancouver, WA (US)

(72) Inventor: Mark E. Rosheim, Vancouver, WA (US)

(*) Notice: Subject to any disclaimer, the term of this patent is extended or adjusted under 35 U.S.C. 154(b) by 723 days.

(21) Appl. No.: 17/488,016

(22) Filed: Sep. 28, 2021

(65) Prior Publication Data

US 2022/0099243 A1  Mar. 31, 2022

Related U.S. Application Data

(60) Provisional application No. 63/084,323, filed on Sep. 28, 2020.

(51) Int. Cl.
  *F16M 11/12* (2006.01)
  *F16M 11/18* (2006.01)
(52) U.S. Cl.
  CPC ........... *F16M 11/123* (2013.01); *F16M 11/18* (2013.01)
(58) Field of Classification Search
  CPC .. F16M 11/123; F16M 11/125; F16M 11/205; F16M 11/18; F16M 11/25; F16M 11/2035; G03B 17/561; G03B 17/565; G05D 3/12; G01B 7/00; G01B 7/004; G02B 7/1805; G12B 5/00; G12B 9/08
  See application file for complete search history.

(56) References Cited

U.S. PATENT DOCUMENTS

| | | | | |
|---|---|---|---|---|
| 2,450,875 A * | 10/1948 | Braddon | ................ | G01C 19/44 74/5.2 |
| 2,740,962 A * | 4/1956 | Hammond, Jr. | ...... | G01S 13/422 342/75 |
| 3,941,001 A * | 3/1976 | LaSarge | ................. | G01C 19/16 74/5.2 |
| 3,965,700 A * | 6/1976 | Nicoletti | ................... | F16D 3/60 464/905 |
| 4,729,253 A * | 3/1988 | Rosheim | ............. | B25J 17/0283 901/29 |
| 4,878,393 A * | 11/1989 | Duta | ..................... | B25J 17/0275 464/106 |
| 5,036,724 A * | 8/1991 | Rosheim | .................. | B25J 9/103 901/29 |
| 5,243,873 A * | 9/1993 | Demers | ................ | B25J 17/0275 901/29 |
| 7,144,326 B2 * | 12/2006 | Thompson | ................ | F16D 3/30 464/106 |
| 7,442,126 B2 * | 10/2008 | Thompson | ................ | F16D 3/30 464/112 |
| 11,867,349 B2 * | 1/2024 | Nguyen | ................ | B64U 20/87 |

(Continued)

*Primary Examiner* — Nkeisha Smith
(74) *Attorney, Agent, or Firm* — Law Office of Craig Bohn; Craig E. Bohn

(57) ABSTRACT

A gimbal of the present disclosure includes an outer yoke and an inner yoke coaxially mounted with respect to a Z axis. A first bearing assembly is held by the outer yoke and rotatable about an X axis. A second bearing assembly is held by the inner yoke and rotatable about a Y axis. The first and second bearing assemblies are coupled to each other by a mechanical interface rotatably connected to both the first and the second bearing assemblies. The inner yoke is rotatable about the Z axis with respect to the outer yoke, or vice versa, such that the X axis may be decoupled from the Y axis.

16 Claims, 31 Drawing Sheets

(56) References Cited

U.S. PATENT DOCUMENTS

| | | | |
|---|---|---|---|
| 2002/0033434 A1* | 3/2002 | Furuta | F16M 11/123 248/487 |
| 2002/0084396 A1* | 7/2002 | Weaver | F16M 13/02 248/278.1 |
| 2017/0254473 A1* | 9/2017 | Katz | F16M 11/123 |

* cited by examiner

SECTION A-A

SECTION B-B

SECTION A-A

SECTION B-B

SECTION A-A

SECTION B-B ated herein, in their entireties, for all purposes: U.S. Provisional
GIMBAL ASSEMBLY

STATEMENT REGARDING FEDERALLY SPONSORED RESEARCH OR DEVELOPMENT

This invention was made with government support under HQ014719C7133 awarded by the Missile Defense Agency. The government has certain rights in the invention.

CROSS-REFERENCES

The following applications and materials are incorporated herein, in their entireties, for all purposes: U.S. Provisional Patent Application Ser. No. 63/084,323, filed Sep. 28, 2020.

FIELD

This disclosure relates to systems and methods for gimbal assemblies. More specifically, the disclosed embodiments relate to gimbal assemblies providing singularity free pitch and yaw movement.

INTRODUCTION

Interest in robotics and robotic joints has greatly increased in recent years. One area in which the use of robots has become important is the replacement of humans in tasks that involve manual work, such as welding, material handling, spray finishing, and assembly. In addition, these same robotic joints have found application in sensor pointing, where speed and precision are important.

SUMMARY

The present disclosure provides systems, apparatuses, and methods relating to gimbal assemblies having singularity-free pitch and yaw motion.

In some embodiments, a gimbal may include: an outer yoke and an inner yoke coaxially mounted with respect to a Z axis; a first bearing assembly held by the outer yoke and rotatable about an X axis; and a second bearing assembly held by the inner yoke and rotatable about a Y axis; wherein the first and second bearing assemblies are coupled to each other by an interior member rotatably connected to both the first and the second bearing assemblies; and wherein the inner yoke is rotatable about the Z axis with respect to the outer yoke, such that the X axis is decoupled from the Y axis.

In some embodiments, a gimbal may include: a U-shaped, stationary first yoke including a first pair of arms having opposing distal end portions defining an X axis; a U-shaped, rotatable second yoke including a second pair of arms having opposing distal end portions defining a Y axis, the second yoke being rotatable with respect to the first yoke about a Z axis oriented perpendicular to the X axis and to the Y axis; a first bearing assembly rotatably coupled to the distal end portions of the first pair of arms of the stationary first yoke, such that the first bearing assembly is rotatable about the X axis; a second bearing assembly rotatably coupled to the distal end portions of the second pair of arms of the rotatable second yoke, such that the second bearing assembly is rotatable about the Y axis; and a mechanical interface rotatably coupled to the first bearing assembly and also rotatably coupled to the second bearing assembly, such that the mechanical interface is rotatable about the Y axis and the X axis. In some embodiments, the mechanical interface may be an annular ring.

In some embodiments, a gimbal may include: a U-shaped, stationary outer yoke including a first pair of arms having opposing distal end portions defining an X axis; a U-shaped, rotatable inner yoke including a second pair of arms having opposing distal end portions defining a Y axis, the inner yoke being rotatable with respect to the outer yoke about a Z axis oriented perpendicular to the X axis and to the Y axis; a first bearing assembly rotatably coupled to the distal end portions of the first pair of arms of the stationary outer yoke, such that the first bearing assembly is rotatable about the X axis; a second bearing assembly rotatably coupled to the distal end portions of the second pair of arms of the rotatable inner yoke, such that the second bearing assembly is rotatable about the Y axis; and a mechanical interface rotatably coupled to the first bearing assembly and the second bearing assembly, such that the mechanical interface is rotatable about the Y axis and the X axis; wherein a mounting arm is fixed to the mechanical interface, such that the mounting arm protrudes from the gimbal.

Features, functions, and advantages may be achieved independently in various embodiments of the present disclosure, or may be combined in yet other embodiments, further details of which can be seen with reference to the following description and drawings.

DETAILED DESCRIPTION

Figure 1:
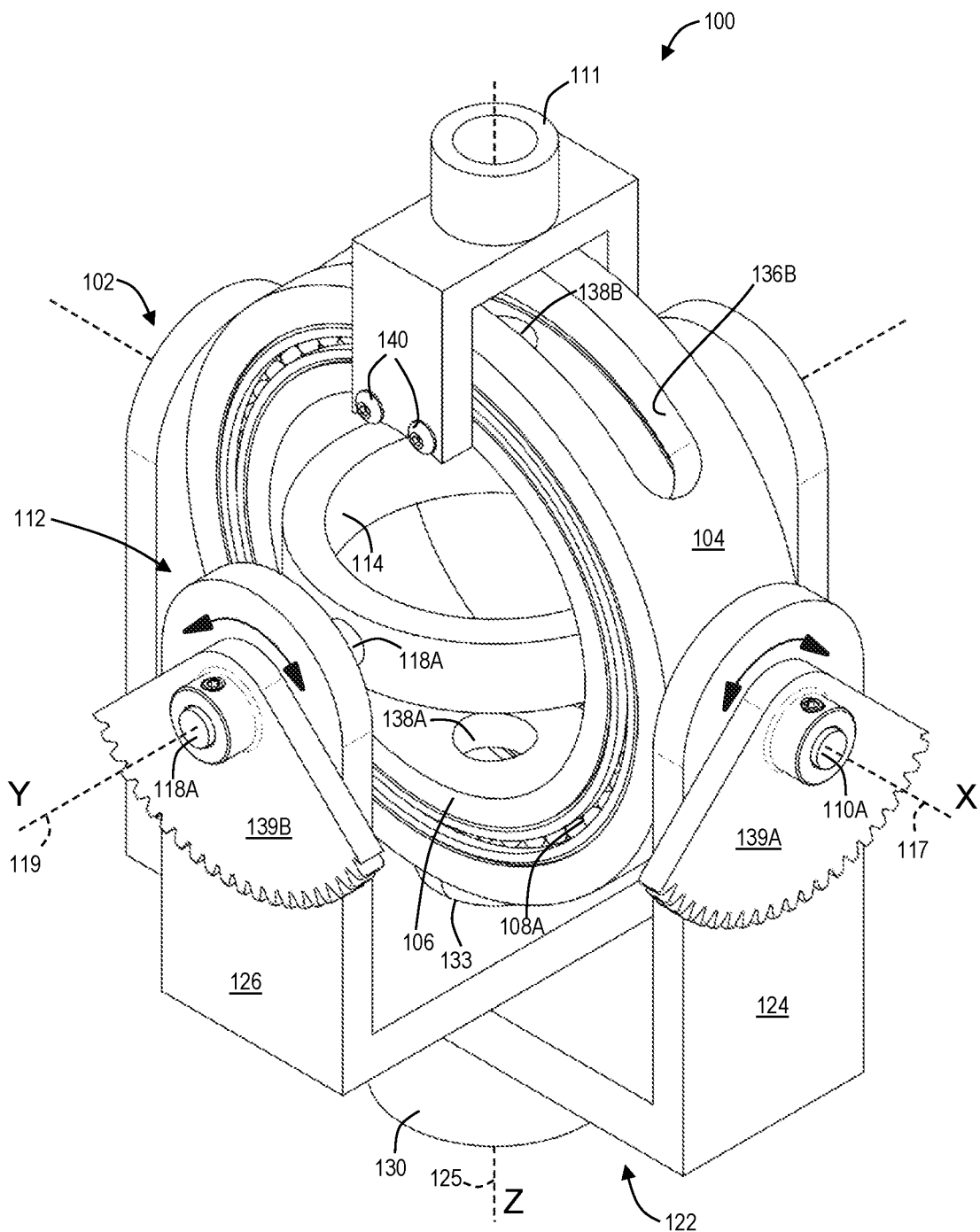
FIG. 1 is an orthogonal view of an illustrative mechanical gimbal in accordance with aspects of the present disclosure.

Various aspects and examples of gimbal assemblies providing singularity-free pitch and yaw motion, as well as related methods, are described below and illustrated in the associated drawings. Unless otherwise specified, a gimbal in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

"Providing," in the context of a method, may include receiving, obtaining, purchasing, manufacturing, generating, processing, preprocessing, and/or the like, such that the object or material provided is in a state and configuration for other steps to be carried out.

Unless clearly unsuitable or stated otherwise, male/female connectors or rotational joints of the present disclosure may be embodied using female/male components. For example, an aperture in a first component may be configured to receive a pin of a second component to form a rotational joint. In an alternative arrangement, the first component comprises the pin, and the second component comprises the aperture.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a gimbal assembly in accordance with the present teachings includes a gimbal disposed within a pair of yokes to provide singularity-free pitch and yaw movement.

Gimbals of the present disclosure include an outer yoke and an inner yoke coaxially mounted with respect to a Z axis. A first bearing assembly is held by the outer yoke and rotatable about an X axis. A second bearing assembly is held by the inner yoke and rotatable about a Y axis. The first and second bearing assemblies are coupled to each other by an interior member (e.g., a rigid, annular ring) rotatably connected to both the first and the second bearing assemblies. The inner yoke is rotatable about the Z axis with respect to the outer yoke, such that the X axis is decoupled from the Y axis. The outer yoke may be stationary. In some embodiments, the inner yoke may be stationary, whereas the outer yoke is rotatable about the Z axis with respect to the inner yoke.

The gimbal may be coupled to an actuator arm (AKA a mounting arm) extending outward radially, above the outer and inner bearing assemblies. The actuator arm is configured to connect to an object or device to be repositioned by the gimbal (e.g., a tool or end effector).

The outer and inner bearing assemblies are pivotally attached to a housing unit comprising the two yokes. In some examples, the housing unit includes a first U-shaped or horseshoe-shaped yoke having arms defining the first (X) axis and a second U-shaped or horseshoe-shaped yoke having arms defining the second (Y) axis. In some examples, the second yoke is nested within the first yoke. The first and second yokes are coaxially mounted (e.g., on bearings), such that the yokes are able to rotate relative to each other about a third axis (Z) oriented perpendicular to the first and second axes.

The outer bearing assembly is pivotally attached to the arms of the first yoke, such that the outer bearing assembly is able to rotate about the first axis and the inner bearing assembly is pivotally attached to the arms of the second yoke, such that the inner bearing assembly is able to rotate about the second axis. In some examples, the bearing assemblies are pivotally attached to the yokes by trunnions extending from the bearing assemblies into end portions of the horseshoe-shaped yoke arms.

Rotation of the yokes relative to each other is constrained by the kinematics of the gimbal. In some examples, the first yoke is held stationary while the second yoke is rotatable relative to the first yoke (i.e., around the third axis). In some examples, the inner bearing assembly is pivotally attached by a pair of trunnions and bearings to the second, rotatable yoke and the outer bearing assembly is pivotally attached by a pair of trunnions and bearings to the first, stationary yoke. Having one or more coaxially rotatable yokes facilitates singularity-free, high-precision pitch and yaw movement of the gimbal.

In some examples, the gimbal assembly includes one or more motors configured to drive pitch and yaw movement of the gimbal. For example, a first motor may be housed within and configured to drive the outer bearing assembly and a second motor may be housed within and configured to drive the inner bearing assembly. Any suitable combination of motors and/or actuators may be used to drive the inner and outer bearing assemblies. For example, the outer and inner bearing assemblies may each house a respective motor having an array of electromagnets and an array of permanent magnets disposed in close proximity to each other. Electrical cables provide electrical power to the array of electromagnets, and magnetic interaction between the electromagnets and the permanent magnets drives rotation of the bearing assembly. In some examples, the electrical cables are housed within a hollow tube extending through the housing unit and the outer and inner bearing assemblies. In some examples, direct current (DC) motors are powered from an alternating current (AC) source. Any other suitable motor or power source may be used to induce rotation of the gimbal.

In some examples, the gimbal assembly includes a spherical drive portion. The spherical drive portion is disposed within two nested yokes coaxially connected, such that the nested yokes are free to rotate relative to each other. The spherical drive portion is pivotally attached to the two nested yokes by trunnions and bearings to allow pitch and yaw rotation of the spherical drive portion. In some examples the trunnions are hollow and configured to receive hydraulic fluid to drive the spherical drive portion hydraulically. In some examples, hydraulic fluid is delivered through the hollow trunnions and used to drive the spherical drive portion in pitch and yaw rotation.

Examples, Components, and Alternatives

The following sections describe selected aspects of illustrative gimbal assemblies as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Mechanical Gimbal

Figure 2:
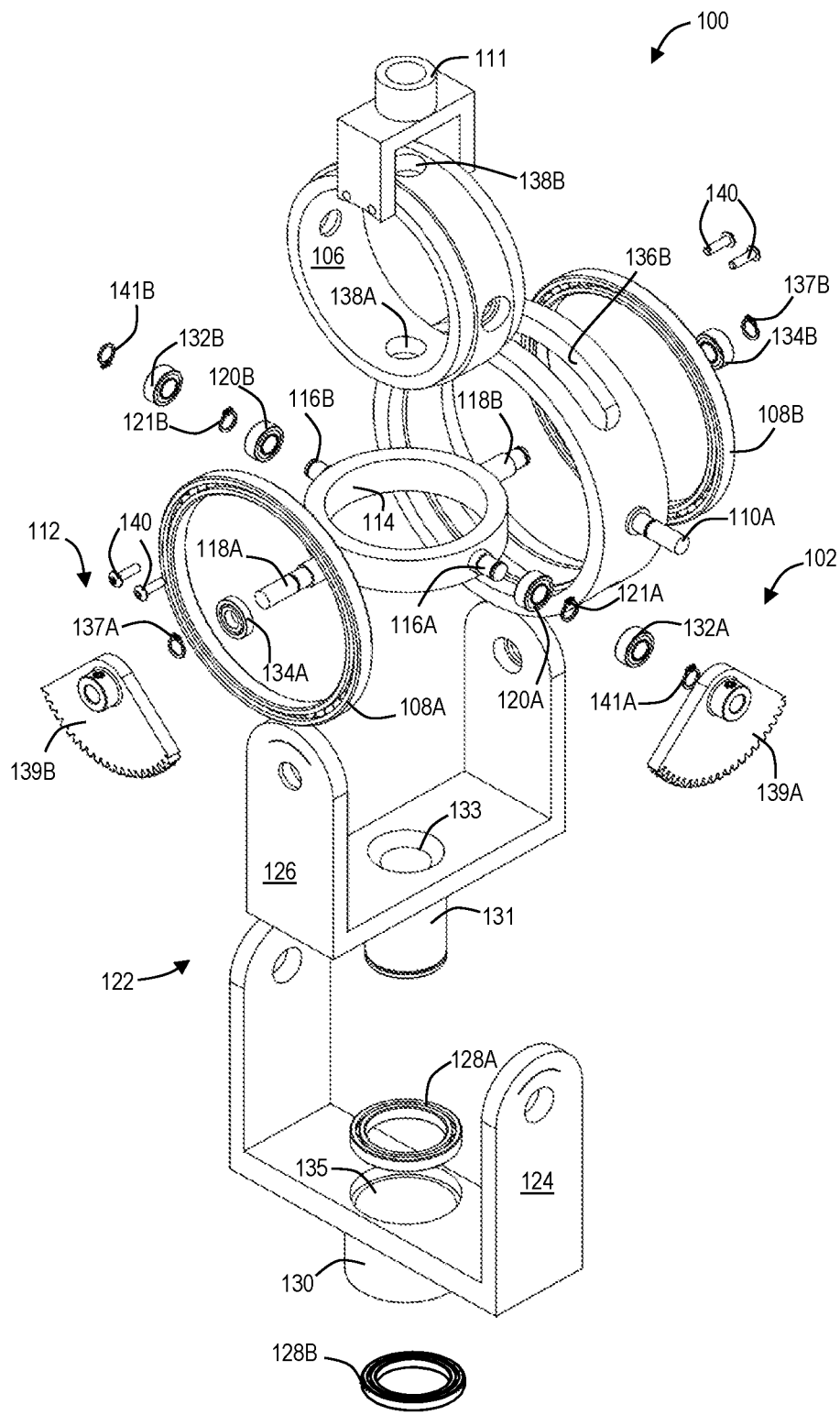
FIG. 2 is an exploded view of the mechanical gimbal of FIG. 1.

As shown in FIGS. 1-11, this section describes an illustrative mechanical gimbal 100 in accordance with aspects of the present disclosure. As shown in FIG. 1 and FIG. 2, mechanical gimbal 100 includes an outer bearing assembly 102 (AKA the first bearing assembly), an inner bearing assembly 112 (AKA the second bearing assembly), and an interior member or mechanical interface 114.

Outer bearing assembly 102 is rotatable as a whole about a first axis 117 (AKA the X axis), via bearings 132A and 132B. The outer bearing assembly has an outer member 104 in the form of a ring, with an inner ring-shaped member 106 concentric with outer member 104. Bearings 108A and 108B are disposed between the inner and outer members, such that the inner member is rotatable relative to the outer member about a second axis 119 (AKA the Y axis).

Outer member 104 of outer bearing assembly 102 is annular or ring-shaped, and has trunnions 110A and 110B disposed 180 degrees apart and extending in opposite directions along axis 117. Inner member 106 is annular or ring-shaped, having a smaller diameter than outer member 104, such that inner member 106 is disposed within outer member 104 and separated from outer member 104 by rotary bearings 108A and 108B.

An actuator arm 111 is fixedly attached to inner member 106 (e.g., using a pair of screws 140) and extends around outer bearing assembly 102 to avoid interference and protrude radially outward from gimbal 100. Actuator arm 111 is configured to receive, couple, or otherwise attach to an object or device to be positioned, pointed, or oriented by gimbal 100. Arm 111 rotates with inner member 106, and may include any suitable bridging structure configured to bypass or detour around outer member 104 to provide a mounting surface at a distal end of the arm. As depicted in FIG. 1, arm 111 may have a C-shaped, U-shaped, or horseshoe-shaped coupling portion attached to inner member 106 and a central tubular (or other-shaped) distal end configured to receive a tool or end effector. Alternatively, or additionally, arm 111 may pass through a slot in the outer bearing assembly.

Gimbal 100 further includes an inner bearing assembly 112. Inner bearing assembly 112 is rotatable as a whole about Y axis 119, via bearings 134A, 134B. Outer bearing assembly 102 and inner bearing assembly 112 are attached to and coupled to each other through a mechanical interface, which in this embodiment includes an inner pivotal ring member 114 having two pairs of pivots. Specifically, ring member 114 includes pivotal rod members 116A and 116B disposed 180 degrees apart extending in opposite directions along the X axis, which couple to outer bearing assembly 102, and trunnions 118A and 118B disposed 180 degrees apart and extending in opposite directions along the Y axis, which couple to inner bearing assembly 112.

More specifically, outer bearing assembly 102 is indirectly pivotally attached to mechanical interface 114 (i.e., ring member 114) through pivotal rod members 116A and 116B disposed in rotary bearings 120A and 120B within openings of inner member 106. Snap rings 121A and 121B are snapped onto pivotal rod members 116A and 116B to prevent sliding of bearings 120A and 120B on the pivotal rod members. Inner member 106 is rotatably coupled to outer member 104 through bearings 108A, 108B. Outer member 104 is coupled to outer bearing assembly 102 through by trunnions 110A and 110B and supported by rotary bearings 132A and 132B of the outer bearing assembly, thus completing the connection between mechanical interface 114 and the outer bearing assembly 102.

Inner bearing assembly 112 is more directly pivotally attached to mechanical interface 114 (i.e., ring member 114) by trunnions 118A and 118B disposed in rotary bearings 134A and 134B of the inner bearing assembly. In some embodiments, the inner bearing assembly may be indirectly pivotally attached to the mechanical interface, and the outer bearing assembly may be more directly pivotally attached to the mechanical interface.

In some cases, inner ring-shaped member 106 along with bearings 108A and 108B may collectively be referred to as a "third bearing assembly." It should be apparent from the foregoing description that gimbal 100 is configured such that this third bearing assembly, along with rigidly attached mounting arm 111, is rotatably coupled to the first bearing assembly and also rotatably coupled to the second bearing assembly, such that the third bearing assembly is rotatable about both the Y axis and the X axis.

Outer bearing assembly 102 and inner bearing assembly 112 are disposed within and supported by a housing unit 122 including U-shaped or horseshoe-shaped outer yoke 124 and U-shaped or horseshoe-shaped inner yoke 126 nested within outer yoke 124. Yoke 124 and yoke 126 are coaxially mounted on bearings 128A and 128B such that yokes 124 and 126 are free to rotate relative to each other about a third axis 125 (AKA the Z axis) oriented perpendicular to axes 117 and 119. Rotation of the yokes is constrained by the kinematics of mechanical gimbal 100. In some examples, yoke 124 is fixed or stationary, while yoke 126 is able to rotate relative to yoke 124 about axis 125. In other examples, yoke 124 may be rotatable, whereas yoke 126 may be fixed. In still other examples, both yokes may be rotatable.

A first hollow tube 130 extends from the base of yoke 124 and a second hollow tube 131 having a radius smaller than hollow tube 130 extends from the base of yoke 126. Second hollow tube 131 extends through hole or aperture 135 in outer yoke 124 and into hollow tube 130. Bearings 128A and 128B are pressed into hollow tube 130 and pressed onto hollow tube 131 allowing rotation of inner yoke 126 relative to outer yoke 124 about Z axis 125.

Figure 3:
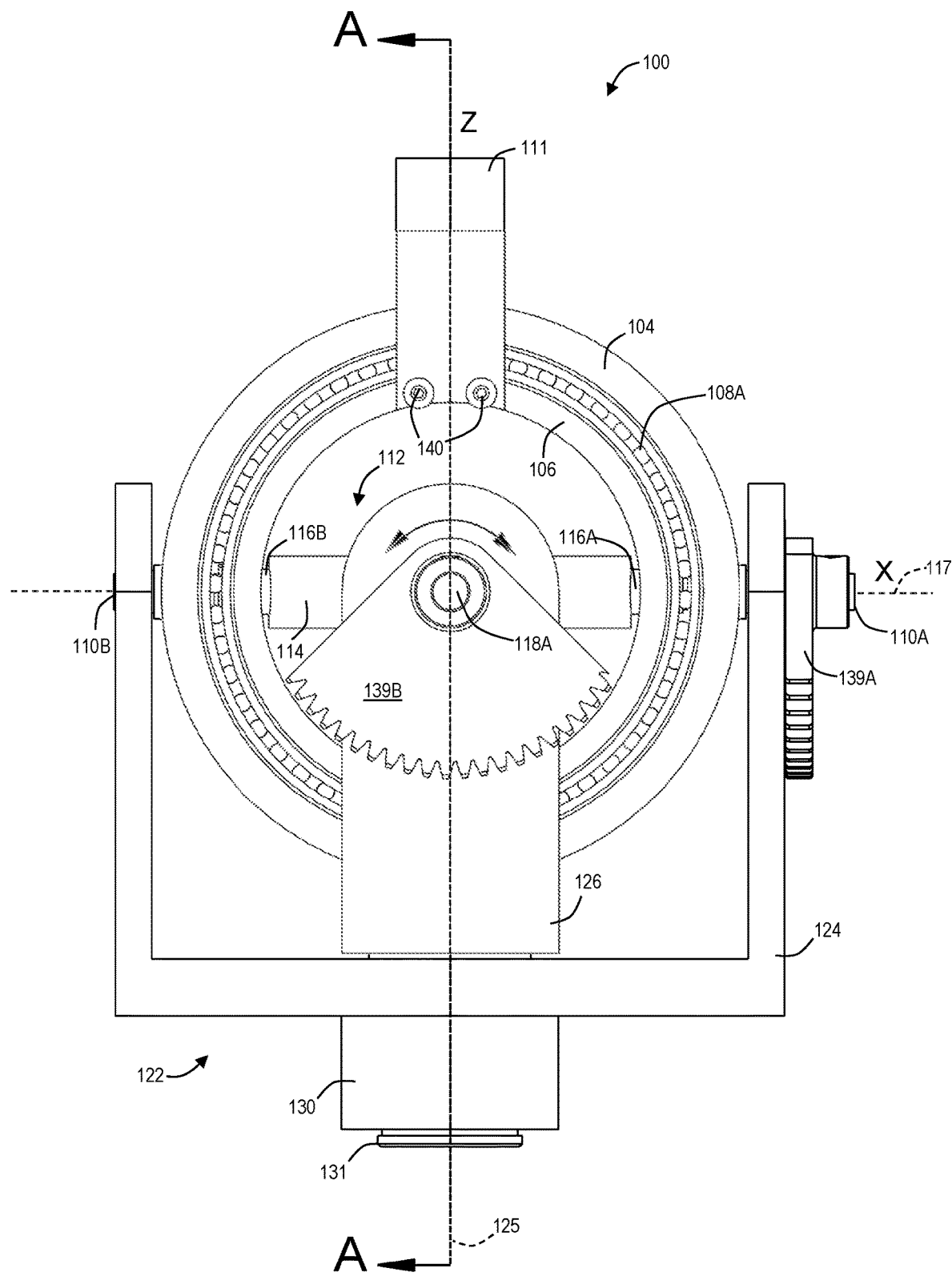
FIG. 3 is a side view of the mechanical gimbal of FIG. 1 viewed along a first axis.
Figure 4:
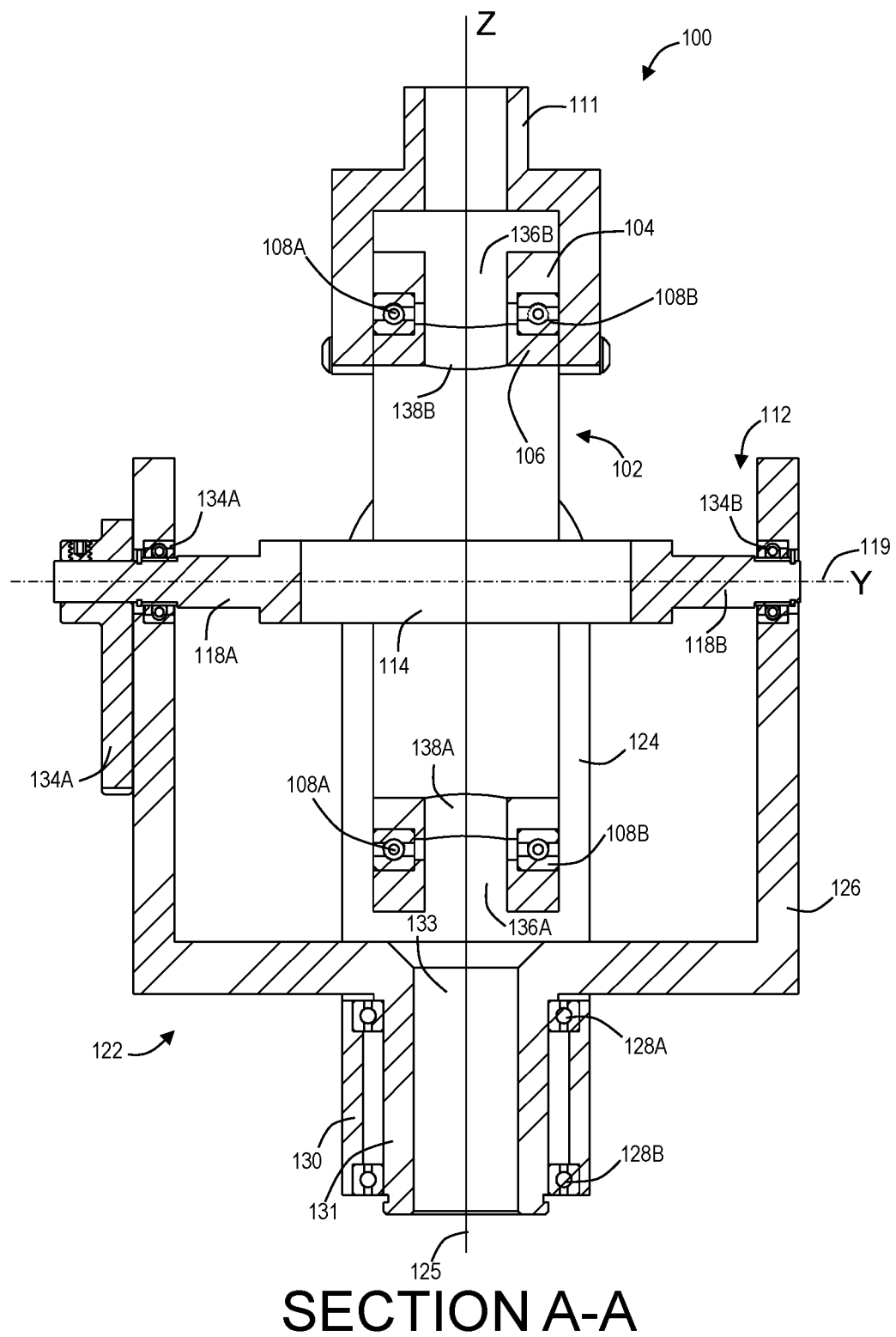
FIG. 4 is a sectional view of the mechanical gimbal of FIG. 1 taken at A-A of FIG. 3.

FIG. 4 is a cross section of gimbal 100 taken at A-A in the side view of FIG. 3, through the plane defined by axis 119 and axis 125 (i.e., the Y-Z plane). As shown in FIG. 4, inner pivotal ring member 114 (i.e., mechanical member 114) is pivotally attached to inner yoke 126 by trunnions 118A and 118B and supported by rotary bearings 134A and 134B in upper end portions of yoke 126 (i.e., in distal end portions of the arms of yoke 126). Snap rings 137A and 137B are snapped onto trunnions 118A and 118B to prevent sliding of bearings 134A and 134B on the trunnions. Thus, inner bearing assembly 112 is able to rotate about Y axis 119.

Figure 5:
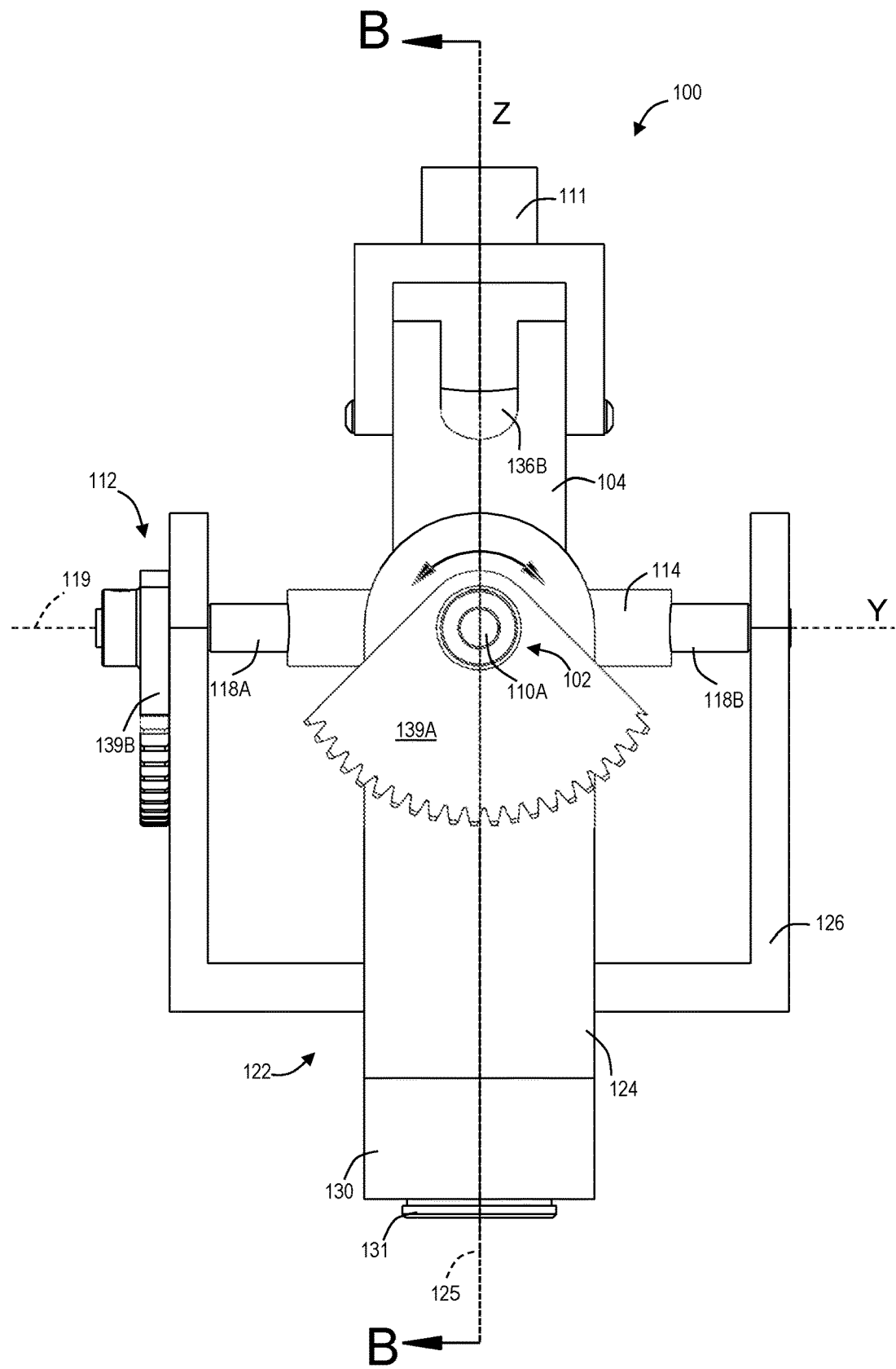
FIG. 5 is a side view of the mechanical gimbal of FIG. 1 viewed along a second axis.
Figure 6:
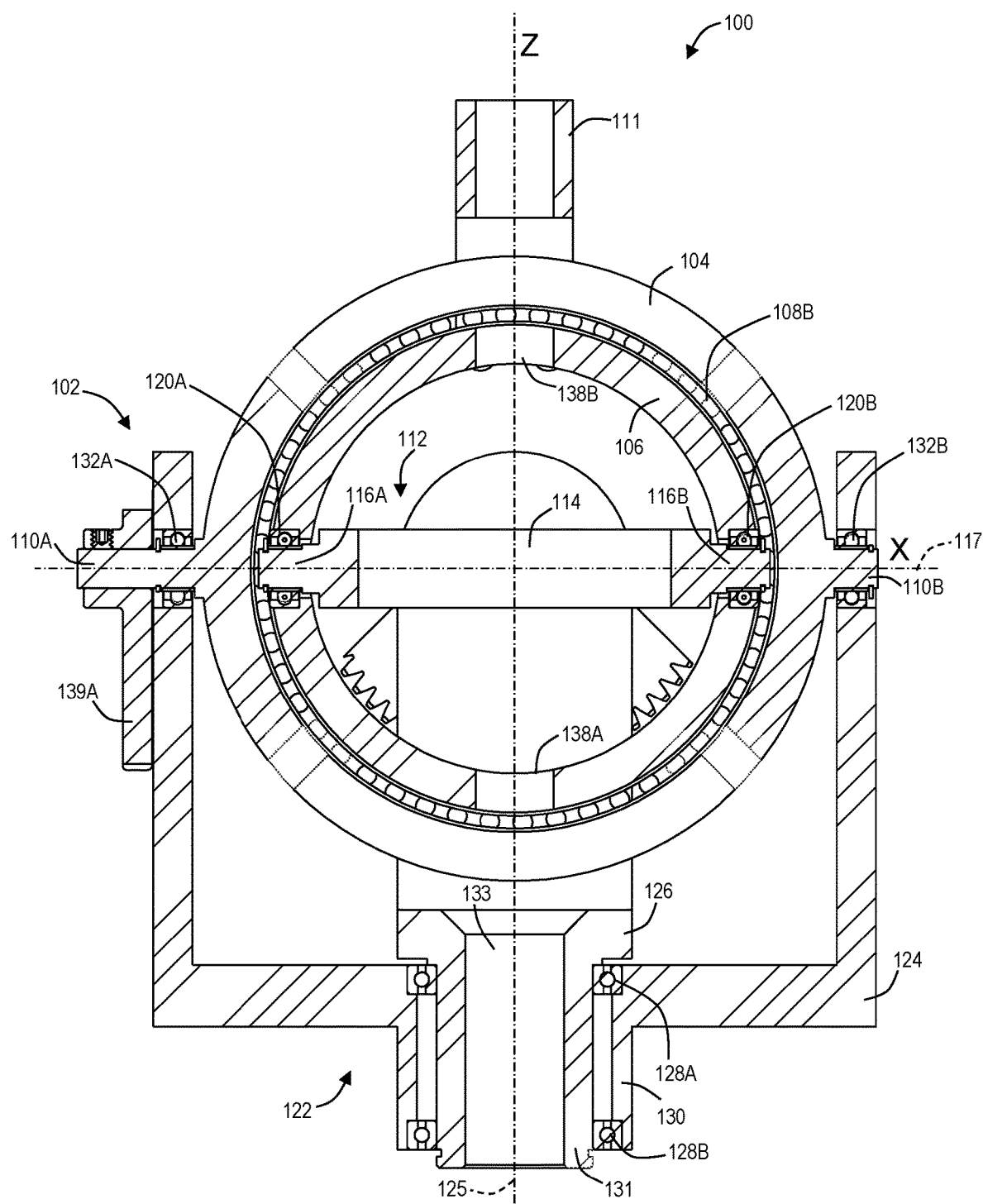
FIG. 6 is a sectional view of the mechanical gimbal of FIG. 1 taken at B-B of FIG. 5.

FIG. 6 is a cross section of gimbal 100 taken at B-B in the side view of FIG. 5, through the plane defined by axis 117 and axis 125 (i.e., the X-Z plane). Outer member 104 of bearing assembly 102 is pivotally attached to yoke 124 by trunnions 110A and 110B and supported by rotary bearings 132A and 132B in upper end portions of yoke 124 (i.e., in distal end portions of the arms of yoke 124). Snap rings 141A and 141B are snapped onto trunnions 110A and 110B to prevent sliding of bearings 132A and 132B on the trunnions. Thus, outer bearing assembly 102 is able to rotate about axis 117.

A hollow passage through gimbal 100 is provided for electrical, optical, mechanical, and/or hydraulic cables to pass through. The hollow passage extends through hollow tubes 130 and 131 in the bases of yokes 124 and 126 and continues through apertures in the gimbal components, to the hollow tube of actuator arm 111. The hollow passage passes through hole or aperture 133 in inner yoke 126, slots 136A and 136B in outer member 104 and holes or apertures 138A and 138B in inner member 106, as best illustrated in FIG. 4.

Gimbal 100 includes partial gears 139A and 139B (AKA spur gears) configured to be driven and selectively rotate the gimbal about X axis 117 and Y axis 119, respectively. Spur gear 139A is fixedly attached (e.g., keyed and/or set-screwed) to an outer end of trunnion 110A of outer bearing assembly 102, and spur gear 139B is fixedly attached (e.g., keyed and/or set-screwed) to an outer end of trunnion 118A of inner bearing assembly 112. Spur gears 139A and 139B each include an arcuate bottom edge having a plurality of teeth configured to mate with the teeth of an external gear drive, and transmit rotational motion from the external gear drive to the trunnions. Thus, spur gear 139A can rotate outer bearing assembly 102 about X axis 117 via trunnion 110A, and spur gear 139B can rotate inner bearing assembly 112 about Y axis 119 via trunnion 118A. Rotation of both spur gears simultaneously results in a compound rotation of gimbal 100 about X axis 117 and Y axis 119. Any other suitable mechanical actuation method may be used to drive gimbal 100.

Figure 7:
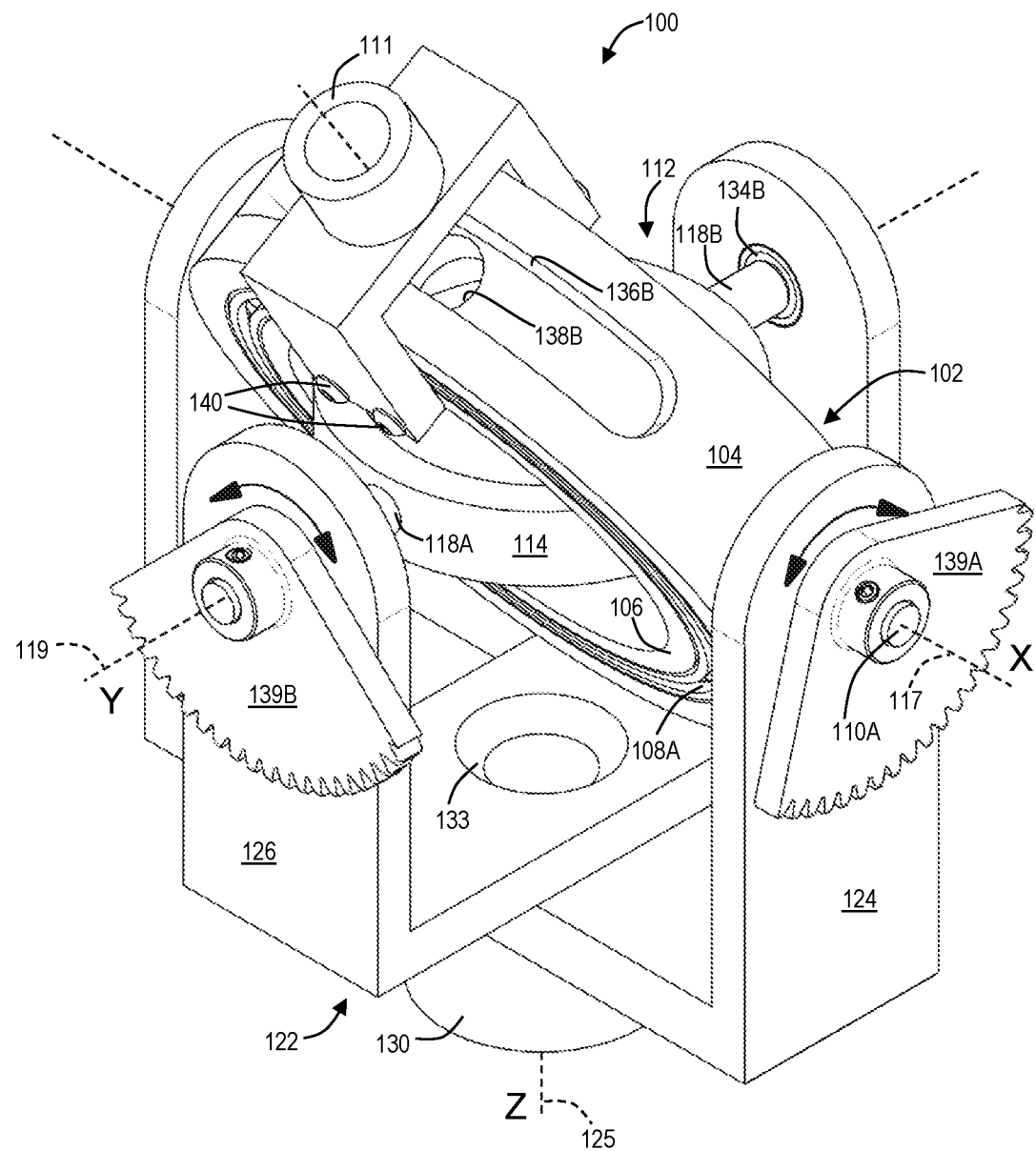
FIG. 7 is an orthogonal view of the mechanical gimbal of FIG. 1 assembly rotated about the first axis.

Accordingly, actuator arm 111 can be oriented with respect to both X axis 117 and Y axis 119 as a result of actuation of gimbal 100. As described above, mechanical member 114 is connected to inner member 106 of outer bearing assembly 102 by pivot pins, such that inner member 106 is able to rotate about X axis 117. As depicted in FIG. 7, mechanical member 114 can remain stationary as inner member 106 rotates about X axis 117.

Figure 8:
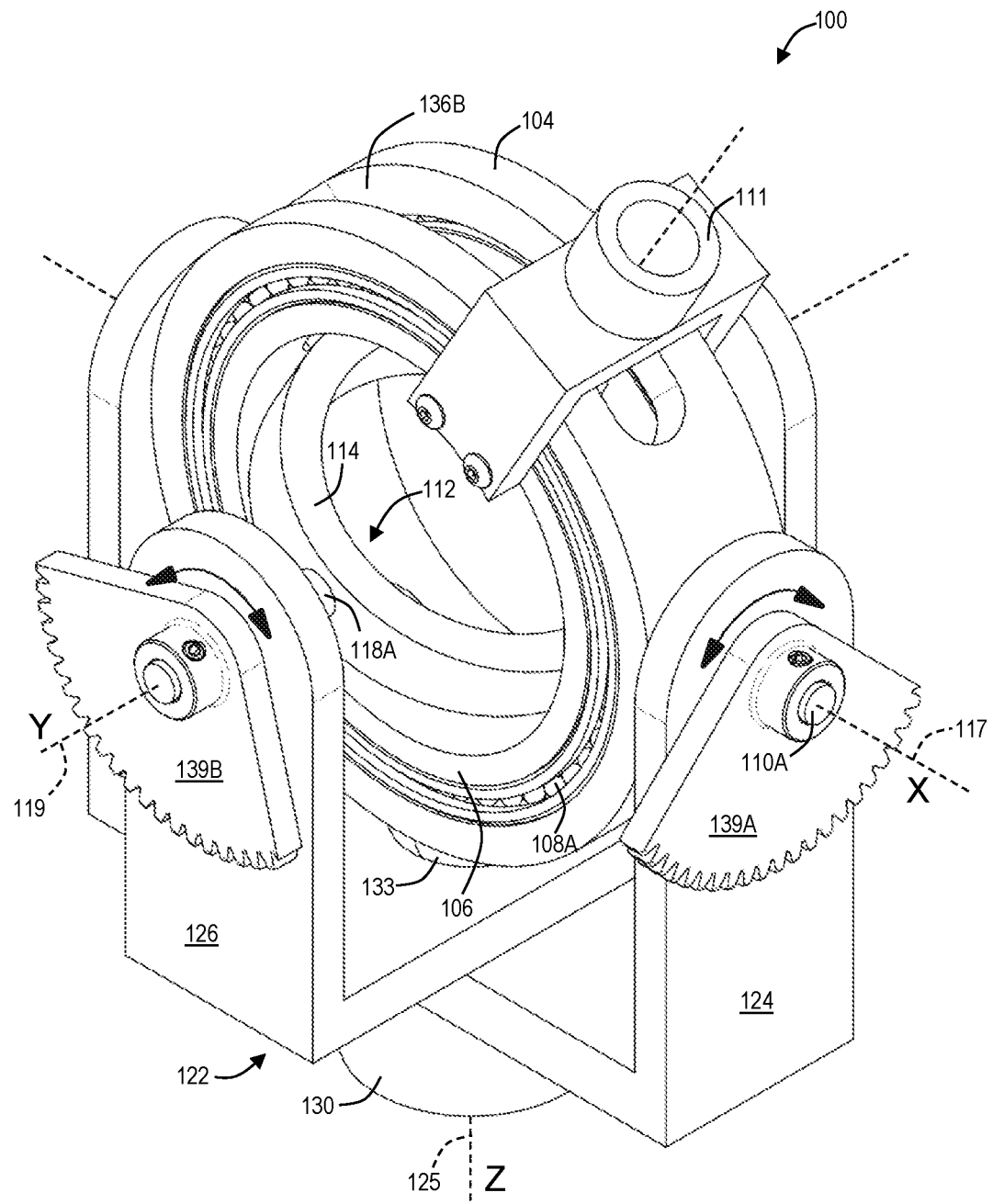
FIG. 8 is an orthogonal view of the mechanical gimbal of FIG. 1 rotated about the second axis.

Inner member 106 is also rotatable about Y axis 119 relative to outer member 104. With reference to FIG. 8, outer member 104 can remain stationary as inner member 106 and inner pivotal ring member 114 rotate together about Y axis 119. Outer member 104 is also rotatable about X axis 117 as inner member 106 is rotated about X axis 117 (see FIG. 7).

As described above, the inner and outer bearing assemblies are supported by yokes 124 and 126. Outer member 104 is pivotally connected to yoke 124 by trunnions such that outer member 104 can rotate about X axis 117 and inner pivotal ring member 114 is pivotally attached to yoke 126 by trunnions such that inner pivotal ring member 114 can rotate about Y axis 119. Inner member 106 is connected to actuator arm 111 such that actuator arm 111 can rotate about both X axis 117 and Y axis 119. In some examples, actuator arm 111 is connected to inner member 106 by a structure extending through slot 1368, such that slot 1368 limits the range of rotation of the gimbal about Y axis 119.

Figure 9:
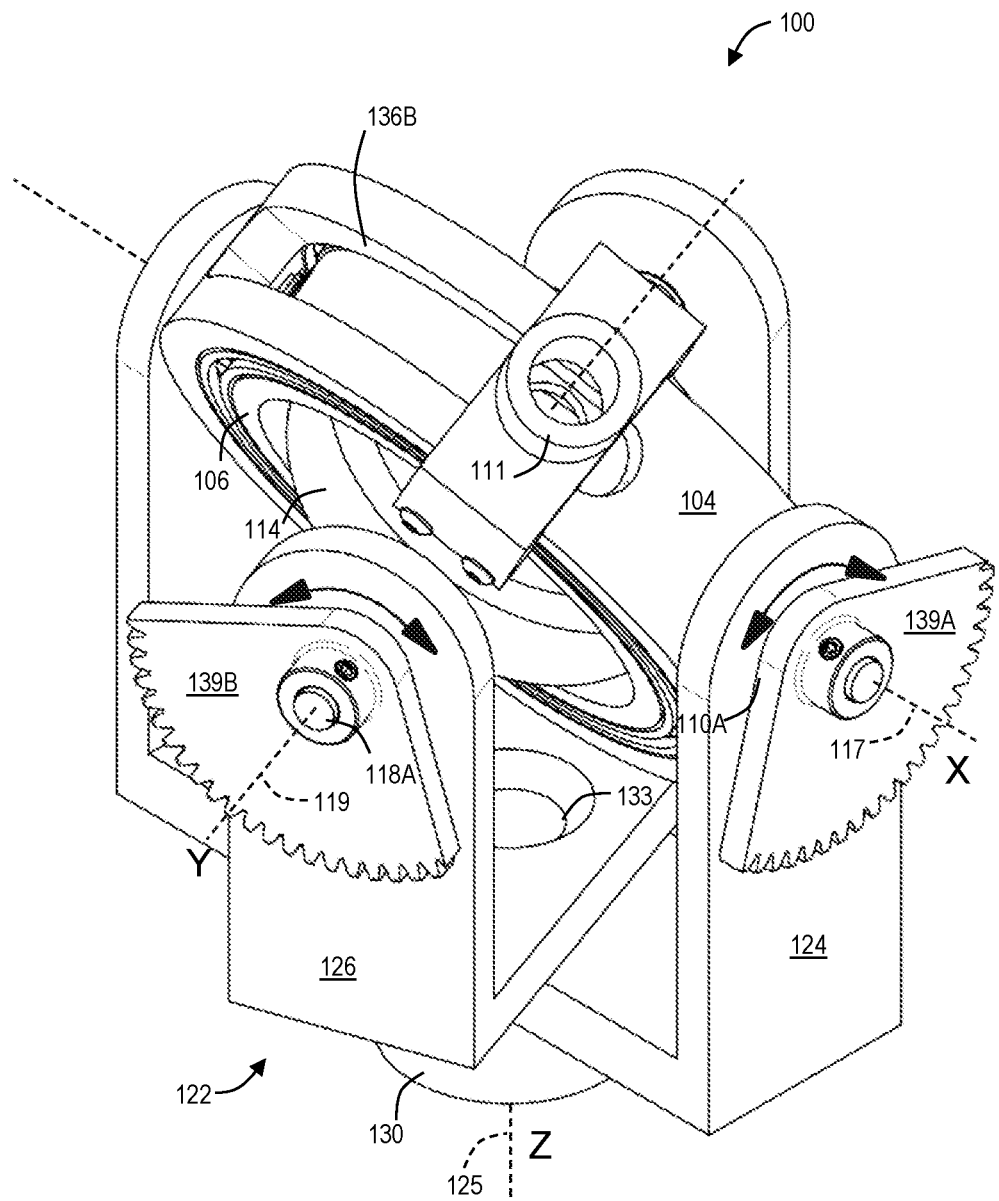
FIG. 9 is an orthogonal view of the mechanical gimbal of FIG. 1 in a compound position rotated about both the first and second axes, with an actuator arm pointed towards the viewer.

As mentioned above, FIG. 7 illustrates gimbal 100 with actuator arm 111 rotated about X axis 117, and FIG. 8 illustrates gimbal 100 with actuator arm 111 rotated about Y axis 119. No relative rotation of yokes 124 and 126 occurs when gimbal 100 is only rotated about a single axis (i.e., X or Y). However, as depicted in FIG. 9, rotation of gimbal 100 about both axes automatically causes relative rotation between yokes 124 and 126. This relative rotation of yokes 124 and 126 decouples Y axis 119 from X axis 117, as these axes rotate relative to each other in a plane about Z axis 125.

Figure 10:
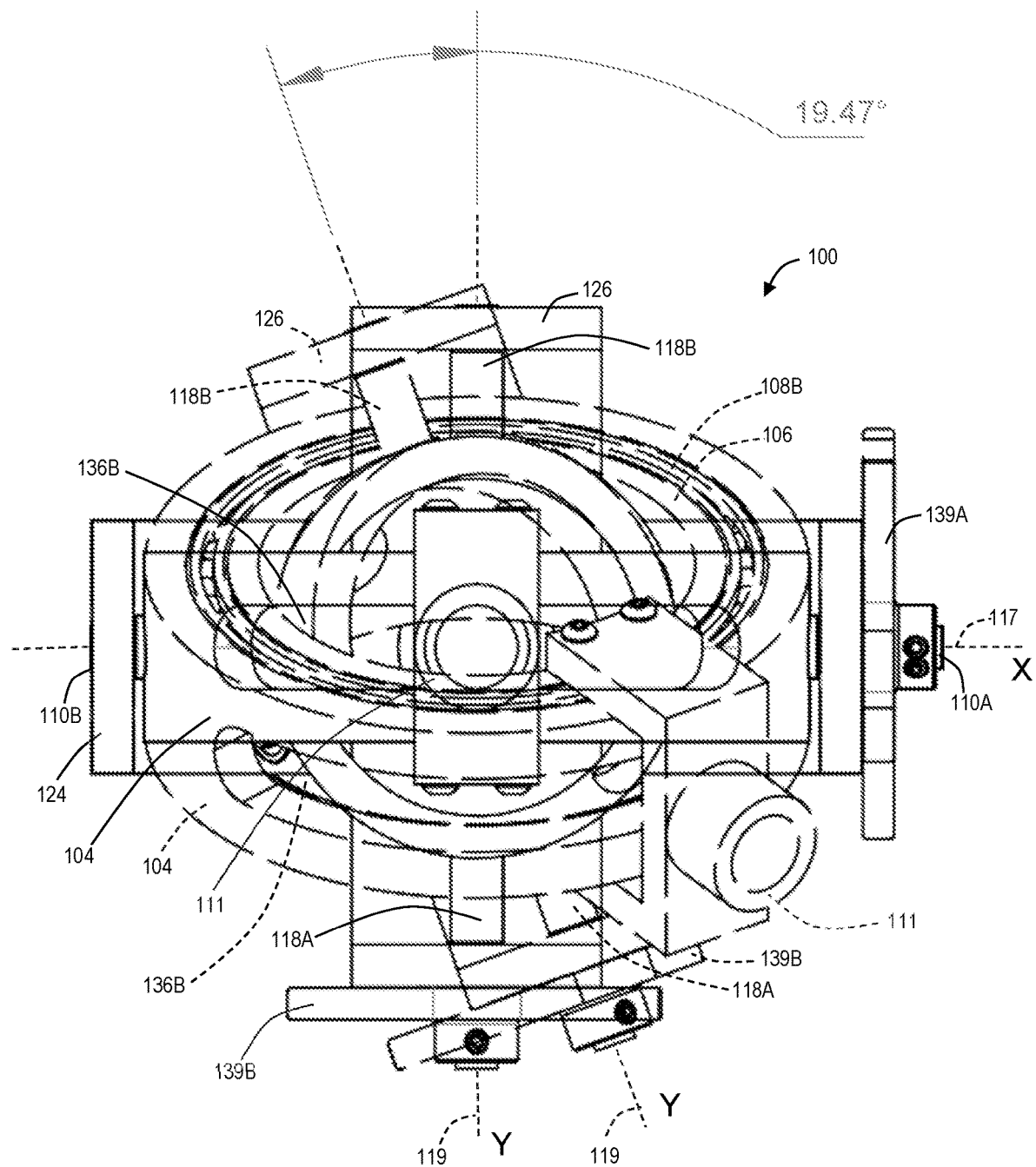
FIG. 10 is a top view of the mechanical gimbal of FIG. 1 illustrating the gimbal in two different positions.
Figure 11:
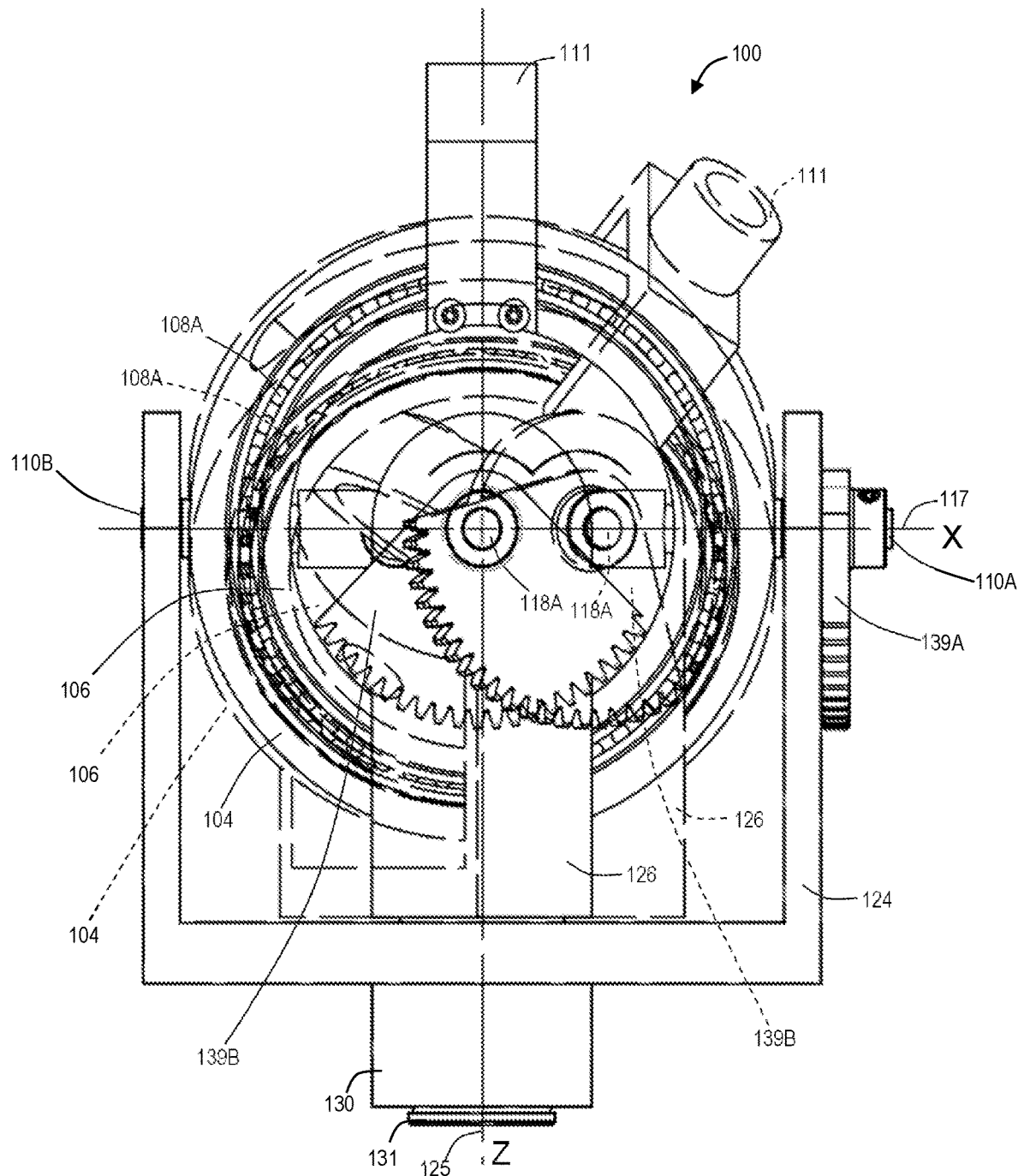
FIG. 11 is a side view of the mechanical gimbal of FIG. 1 also in two different positions.

Said another way, consider inner bearing assembly 102 and outer bearing assembly 112 as analogous to a sphere or globe. Actuator arm 111 resides at the north pole in this analogy, with latitude lines extending down to the bottom or south pole. As on a geographical globe, the latitude lines are therefore farthest apart at the equator and closest at the north and south poles. Now consider placing the globe in a hemispherical cup, where the lip of the cup represents a constant equatorial plane. As actuator arm 111 is rotated south, the latitude lines gradually converge at the equator lip. The rotatable trunnions also converge to account for this phenomenon. Gimbals of the present disclosure utilize coaxially mounted yokes attached to the trunnions to change the distance between the trunnions as the actuator arm is rotated. FIGS. 10 and 11 further illustrate relative rotation of the yokes by showing the gimbal in two different superimposed positions from a top and a side view.

B. Illustrative Electrical Gimbal

As shown in FIGS. 12-21, this section describes an illustrative electrical gimbal 200 in accordance with aspects of the present disclosure. Electrical gimbal 200 includes integrated electric motors (e.g., hub motors or the like) configured to drive the gimbal.

Figure 12:
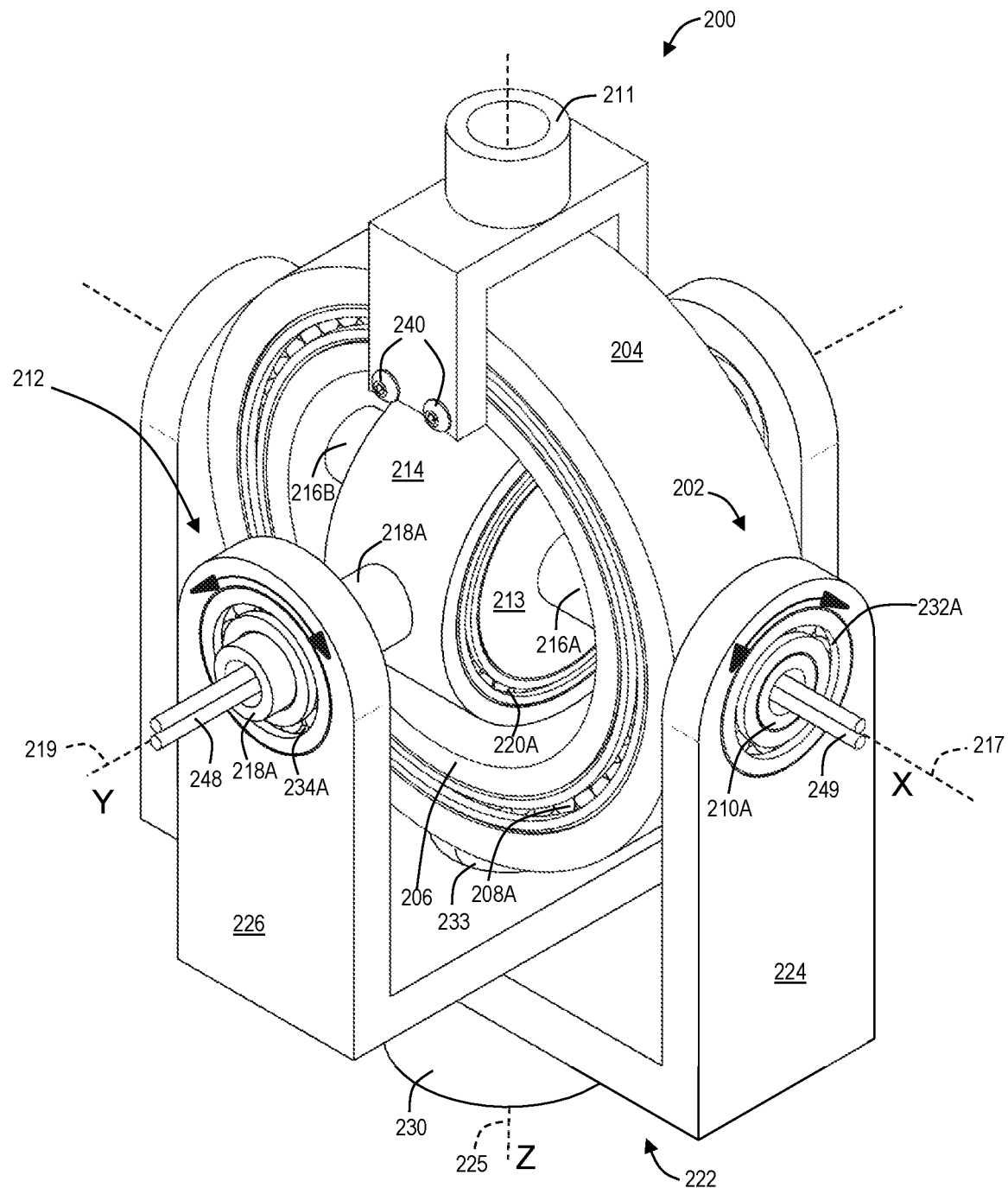
FIG. 12 is an orthogonal view of another illustrative gimbal in accordance with aspects of the present disclosure.
Figure 13:
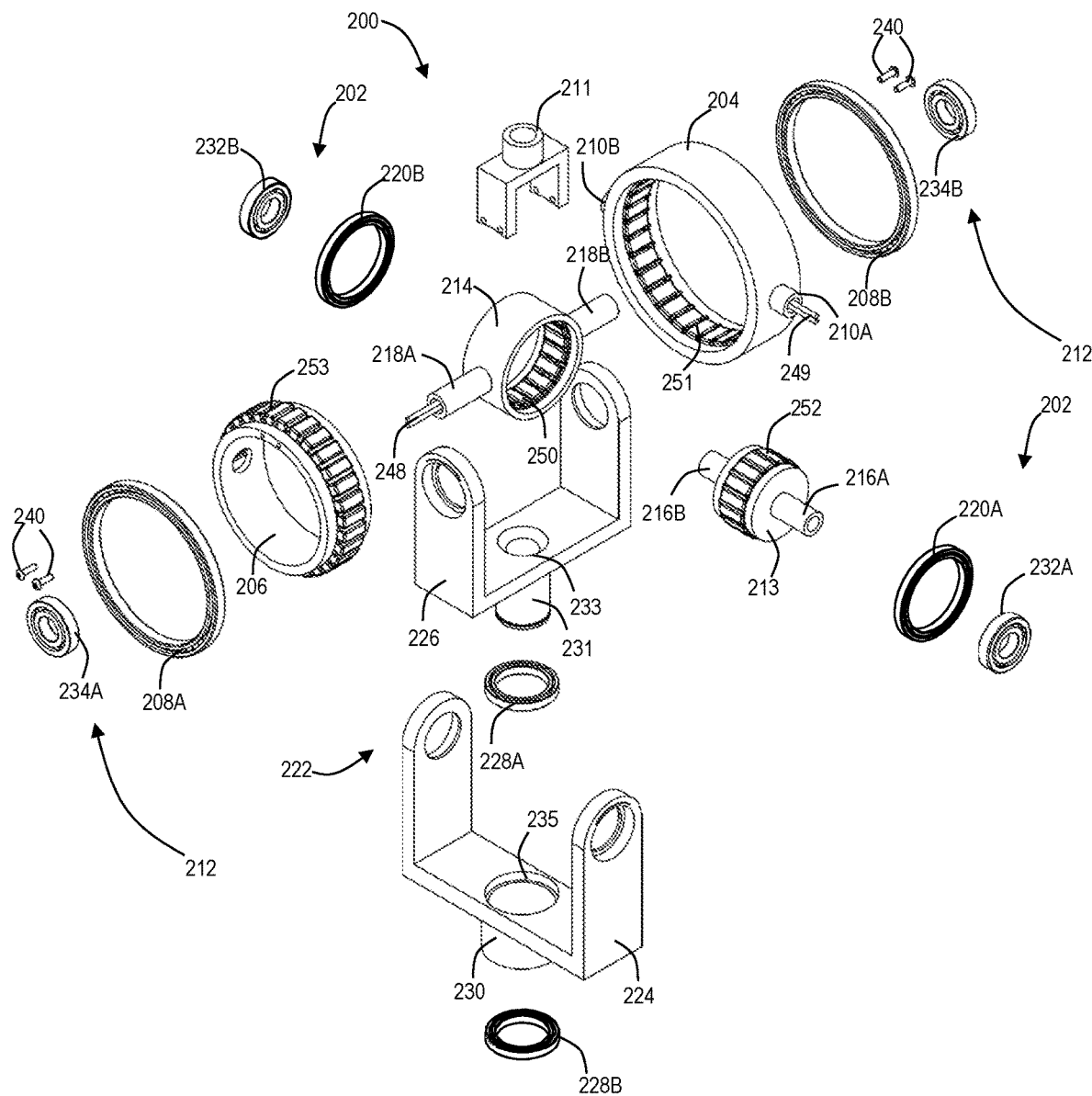
FIG. 13 is an exploded view of the gimbal of FIG. 12.

As shown in FIG. 12 and FIG. 13, electrical gimbal 200 includes an outer bearing assembly 202 (AKA the first bearing assembly) and an inner bearing assembly 212 (AKA the second bearing assembly). Outer bearing assembly 202 is rotatable as a whole about a first axis 217 (AKA the X axis), via bearings 232A and 232B. Outer bearing assembly 202 can be viewed as including an outer member 204 in the form of a rigid ring, an inner member 206 concentric with outer member 204, and bearings 208A and 208B disposed between outer member 204 and inner member 206 such that inner member 206 is rotatable relative outer member 204 about an axis 219 (AKA the Y axis).

Outer member 204 of outer bearing assembly 202 is annular or ring-shaped and has trunnions 210A and 210B disposed 180 degrees apart extending outwardly in opposite directions along X axis 217, transverse to Y axis 219. An actuator arm 211 is fixedly attached to inner member 206 (e.g., by a pair of screws 240) and extends radially outward above outer bearing assembly 202. Actuator arm 211 is configured to receive, couple, or otherwise attach to an object or device to be positioned or oriented by gimbal 200. Arm 211 rotates with inner member 206, and may include any suitable bridging structure configured to bypass or detour around or through outer member 204 to provide a mounting surface at a distal end of the arm. As depicted in FIG. 12, arm 211 may have a C-shaped, U-shaped, or horseshoe-shaped bridging or coupling portion attached to inner member 206, and a tubular (or other-shaped) distal end configured to receive a tool or end effector. In some examples, arm 211 may pass through a slot in outer member 204.

Inner bearing assembly 212 is rotatable as a whole about Y axis 219, via bearings 234A and 234B. Outer bearing assembly 202 and inner bearing assembly 212 are attached to and coupled to each other through a mechanical interface, which in this embodiment includes an inner pivotal assembly 214 having two pairs of pivots. Specifically, mechanical interface 214 includes an inner portion with rod members 216A and 216B disposed 180 degrees apart extending in opposite directions along the X axis, which couple to outer bearing assembly 202 through inner member 206, and trunnions 218A and 218B disposed 180 degrees apart and extending in opposite directions along the Y axis, which couple to inner bearing assembly 212.

More specifically, outer bearing assembly 202 is indirectly pivotally attached to mechanical interface 214 through pivotal rod members 216A and 216B disposed within openings of inner member 206. Inner member 206 is rotatably coupled to outer member 204 through bearings 208A, 208B. Outer member 204 is coupled to outer bearing assembly 202 through by trunnions 210A and 210B and supported by rotary bearings 232A and 232B of the outer bearing assembly, thus completing the connection between mechanical interface 214 and the outer bearing assembly 202.

Inner bearing assembly 212 is more directly pivotally attached to mechanical interface 214 by trunnions 218A and 218B disposed in rotary bearings 234A and 234B of the inner bearing assembly. In some embodiments, the inner bearing assembly may be indirectly pivotally attached to the mechanical interface, and the outer bearing assembly may be more directly pivotally attached to the mechanical interface.

Mechanical interface 214 has trunnions 218A and 218B disposed 180 degrees apart, extending outwardly in opposite directions along Y axis 219. The mechanical interface includes a cylindrical inner member 213, having rod members 216A and 216B extending outwardly in opposite directions along X axis 217. Inner member 213 is concentric within the outer cylindrical portion of mechanical interface 214, and is rotatably coupled to the outer portion of mechanical interface 214 by rotary bearings 220A and 220B. Pivotal rod members 216A and 216B attach inner member 213 to inner member 206 of the outer bearing assembly, such that inner member 213 and inner member 206 rotate together about the X axis.

Housing unit 222 includes U-shaped or horseshoe-shaped yokes 224 and 226 coaxially mounted on bearings 228A and 228B, such that yokes 224 and 226 are able to rotate relative to each other about an axis 225 (AKA the Z axis), perpendicular to axes 217 and 219. Yoke 226 is nested within yoke 224, such that yoke 226 may be referred to as the inner yoke and yoke 224 may be referred to as the outer yoke. Relative rotation of yokes 224 and 226 is constrained by the kinematics of gimbal 200. In some examples, yoke 224 remains stationary, while yoke 226 is able to rotate relative to yoke 224 about axis 225. In other examples, yoke 224 or both yokes may rotate about the Z axis.

Extending from the base of yoke 224 is a first hollow tube 230 and extending from the base of yoke 226 is a second hollow tube 231 having a radius smaller than hollow tube 230. Second hollow tube 231 extends through hole or aperture 235 in yoke 224 and into first hollow tube 230. Bearings 228A and 228B are pressed into hollow tube 230 and pressed onto hollow tube 231 such that yoke 226 rotates relative to yoke 224 about Z axis 225. In some examples, electrical cables may extend through second hollow tube 231 and hole 233 in yoke 226 to connect to motors of the bearing assemblies.

Figure 14:
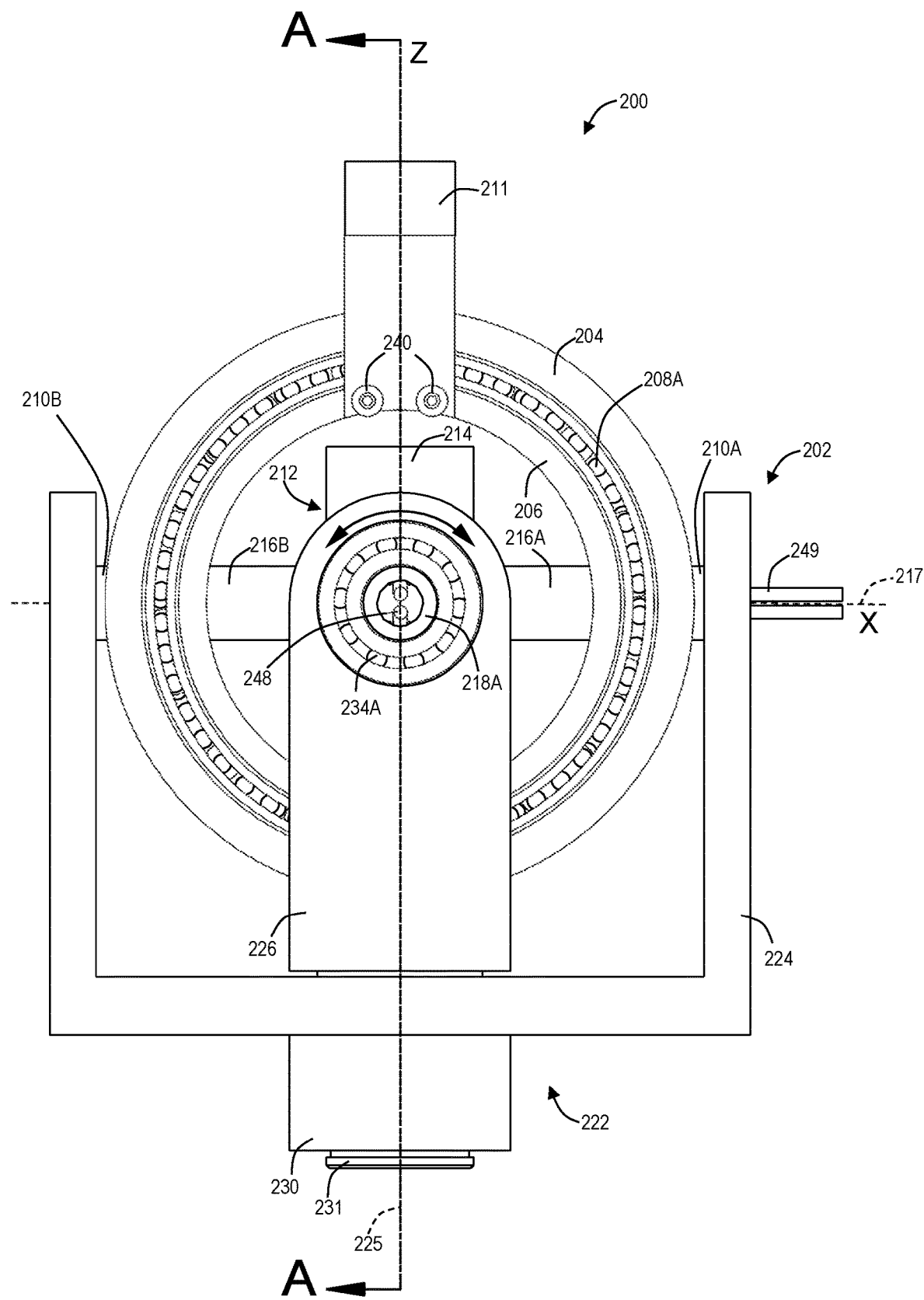
FIG. 14 is a side view of the gimbal of FIG. 12 viewed along a first axis.
Figure 15:
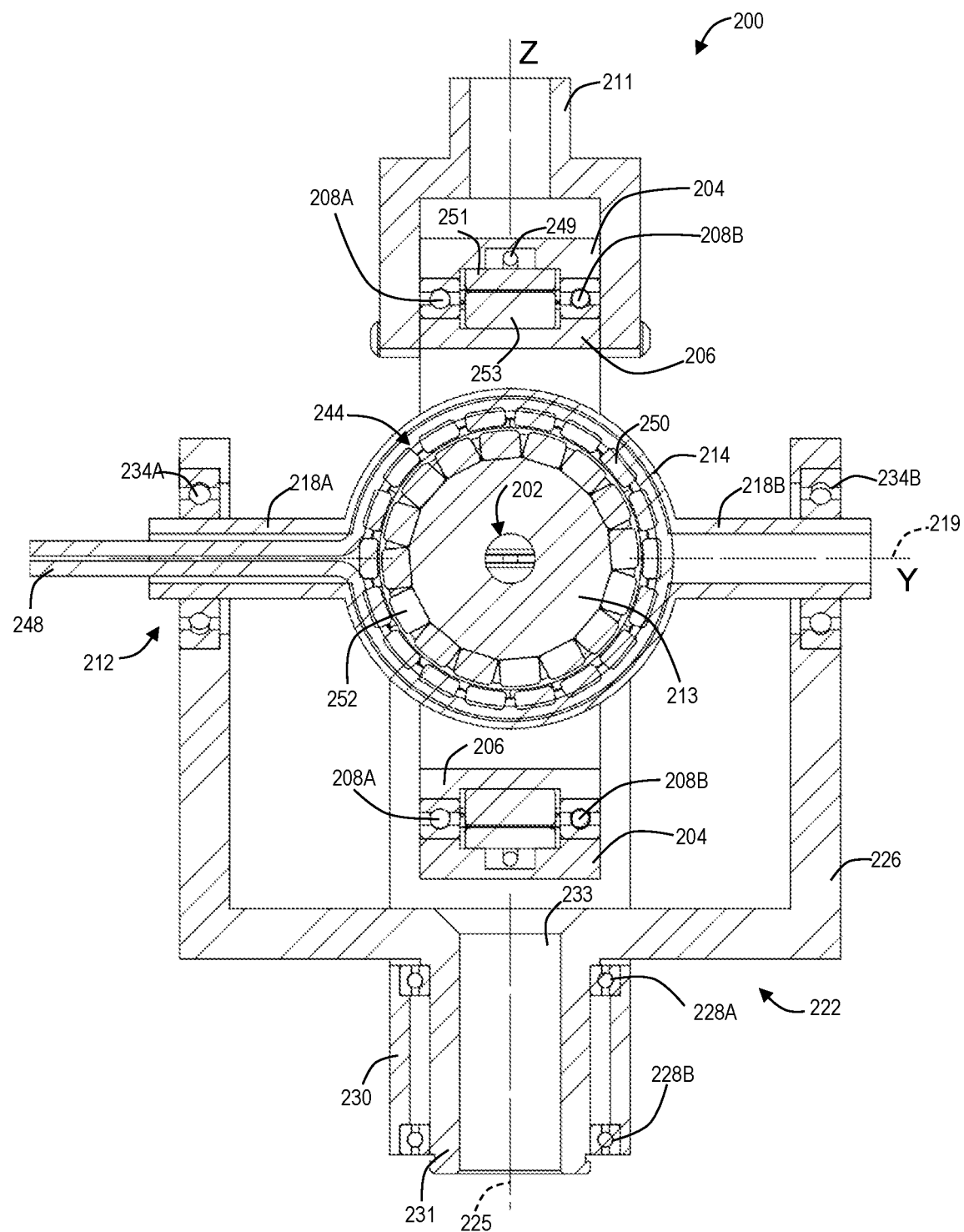
FIG. 15 is a sectional view of the gimbal of FIG. 12 taken at A-A of FIG. 14.

FIG. 15 is a cross section of gimbal 200 taken at A-A in the side view of FIG. 14, through the plane defined by Y axis 219 and Z axis 225 (i.e., the Y-Z plane). As shown in FIG. 15, mechanical interface 214 is rotationally attached to yoke 226 by trunnions 218A and 218B disposed within rotary bearings 234A and 234B in upper end portions of the arms of yoke 226. Thus, inner bearing assembly is able to rotate about Y axis 219.

Figure 16:
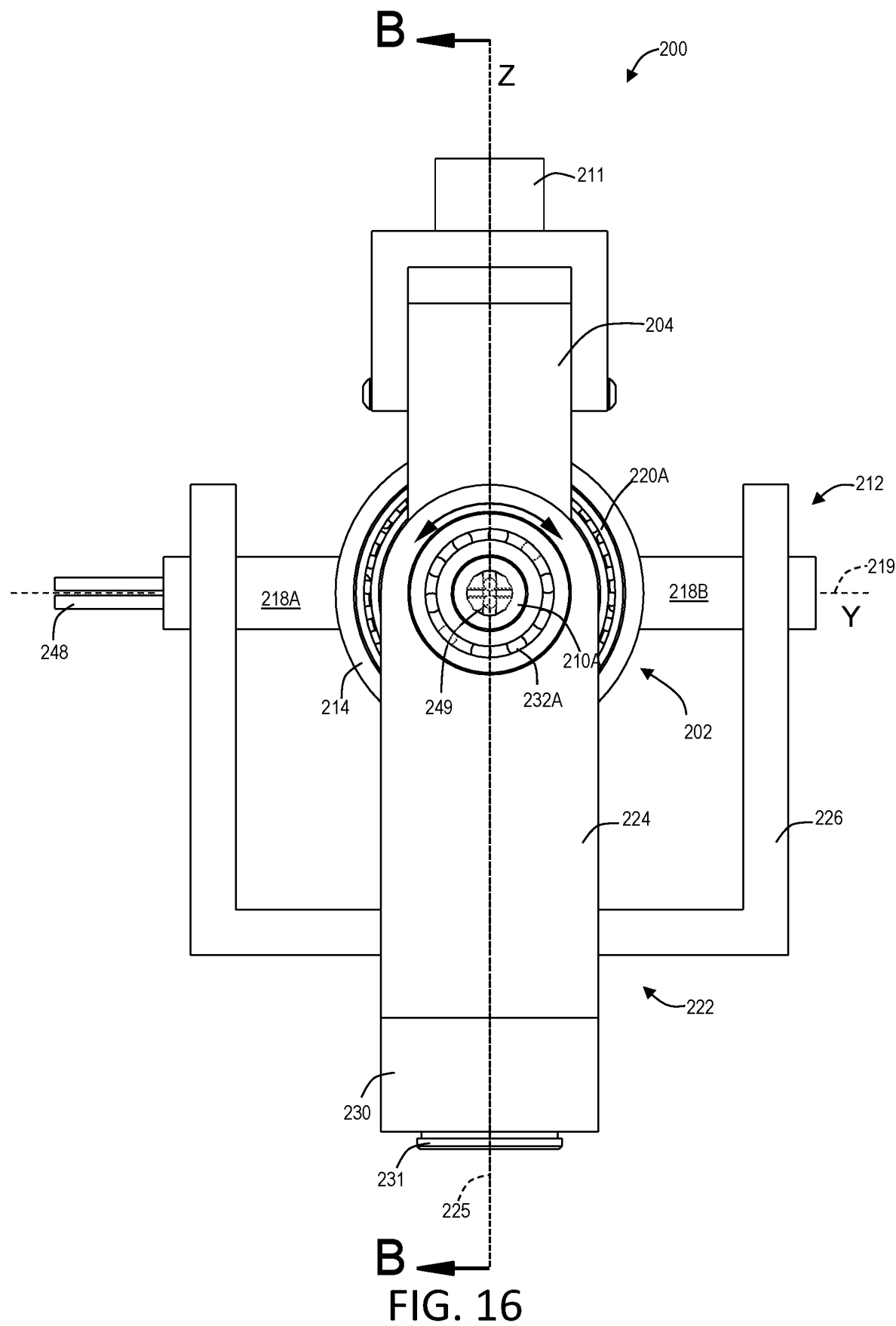
FIG. 16 is a side view of the gimbal of FIG. 12 viewed along a second axis.
Figure 17:
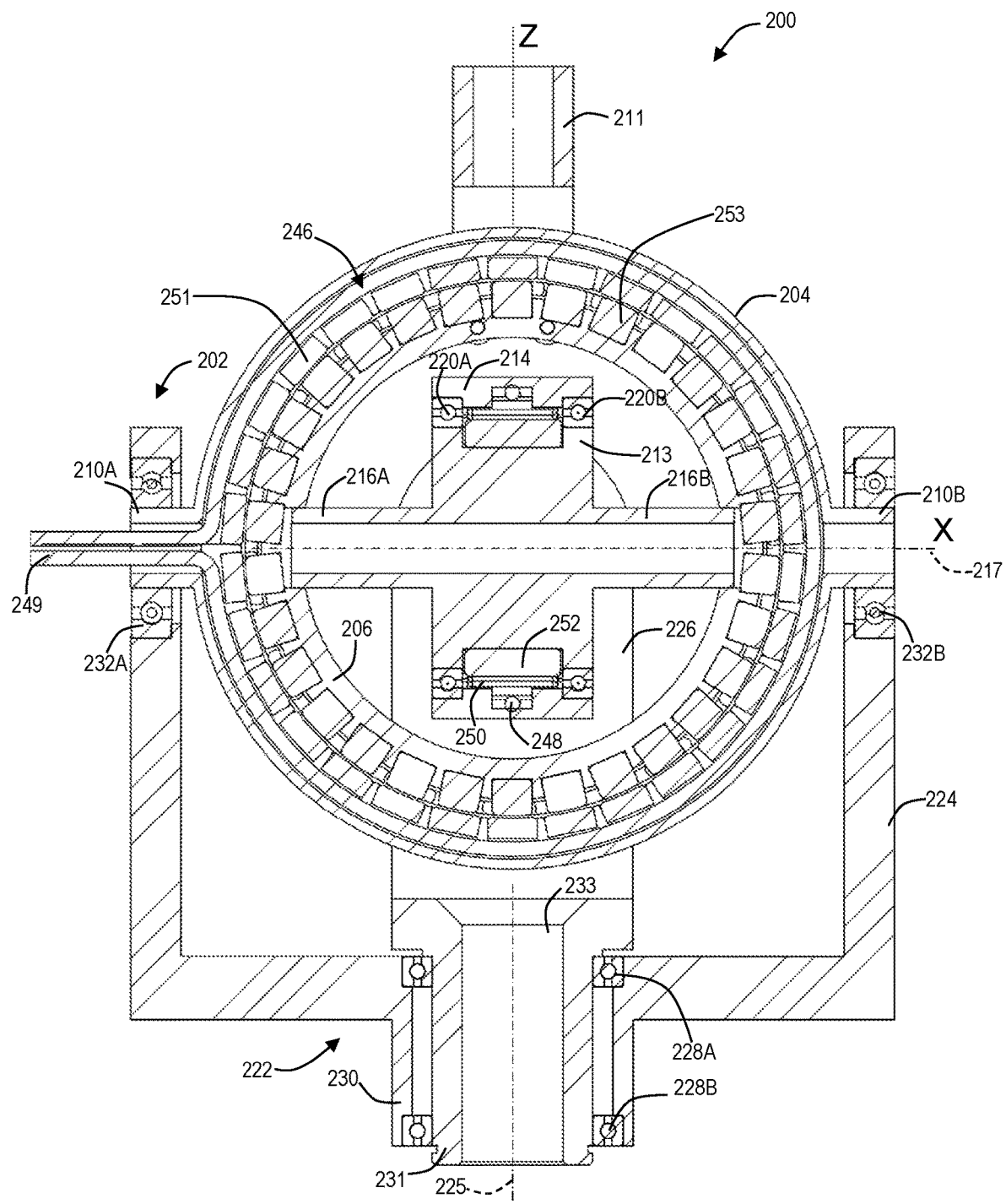
FIG. 17 is a sectional view of the gimbal of FIG. 12 taken at B-B of FIG. 16.

FIG. 17 is a cross section of the gimbal taken at B-B in the side view of FIG. 16, through the plane defined by X axis 217 and Z axis 225 (i.e., the X-Z plane). As depicted in FIG. 17, outer member 204 of outer bearing assembly 202 is rotationally attached to yoke 224 by trunnions 210A and 210B disposed within rotary bearings 232A and 232B in upper end portions of the arms of yoke 224. Thus, outer bearing assembly is rotatable about X axis 217.

Electric gimbal 200 further includes an integrated inner motor assembly 244 housed within and configured to drive inner pivotal bearing assembly 212 by rotating the inner portion 213 of mechanical interface 214 relative to the outer portion of the mechanical interface, and an integrated outer motor assembly 246 housed within and configured to rotate inner ring 204 relative to outer ring 206. As best shown in FIG. 15, a radial array of outwardly facing permanent magnets 252 wraps around the outer circumference of inner rotatable member 213 of the mechanical interface. A similar radial array of electromagnets 250 wraps around the inner circumference of the concentric outer portion of mechanical interface 214. Electrical cables 248 extend through hollow tubes in trunnions 218A and 218B to carry electrical power to electromagnets 250. Magnetic interactions between electromagnets 250 and permanent magnets 252 selectively induce clockwise and counterclockwise rotation of the inner rotatable member 213 about X axis 217.

As shown in FIG. 17, outer motor assembly 246 functions in the same manner as inner motor assembly 244 (described above), using electrical cables 249, an array of inwardly facing electromagnets 251, and an array of outwardly facing permanent magnets 253. Inwardly facing electromagnets 251 wrap around the inner circumference of outer ring 204 and permanent magnets 253 wrap around the outer circumference of inner ring 206. Electrical cables 249 extend through hollow tubes in trunnions 210A and 210B to carry electrical power to electromagnets 251. Magnetic interactions between the electromagnets and permanent magnets selectively induce clockwise and counterclockwise rotation of inner ring 206 about axis Y 219. Electrically actuating both the inner and outer motor assemblies simultaneously causes a compound rotation of actuator arm 211 about both axes 217 and 219. Additionally, gimbal 200 may be rotated via hollow tube (AKA central support shaft) 230, about Z axis 225.

In some examples, the electrical motors are direct current (DC) motors but are powered by an alternating current (AC) source. The DC motors may employ a commutation system to convert the AC power into DC power. Any suitable electrical motor, and/or power source may be used to drive the gimbal.

Accordingly, actuator arm 211 is rotatable about both X axis 217 and Y axis 219 as a result of actuation of gimbal 200. As described above, inner member 213 of mechanical interface 214 is connected to inner member 206 of outer bearing assembly 202 by rods 216A and 216B. Inner member 206 rotates about X axis 217 as inner rotatable member 213 rotates about X axis 217. The outer portion of mechanical interface 214 remains stationary as inner member 206 and inner rotatable member 213 rotate about X axis 217 (See FIG. 18).

Inner member 206 is also rotatable about Y axis 219 relative to outer member 204. With reference to FIG. 19, outer member 204 can remain stationary as inner member 206 and inner bearing assembly 212 rotate together about axis 219. Outer member 204 is also rotatable about X axis 217 as inner member 206 is rotated about X axis 217 (See FIG. 18).

Figure 18:
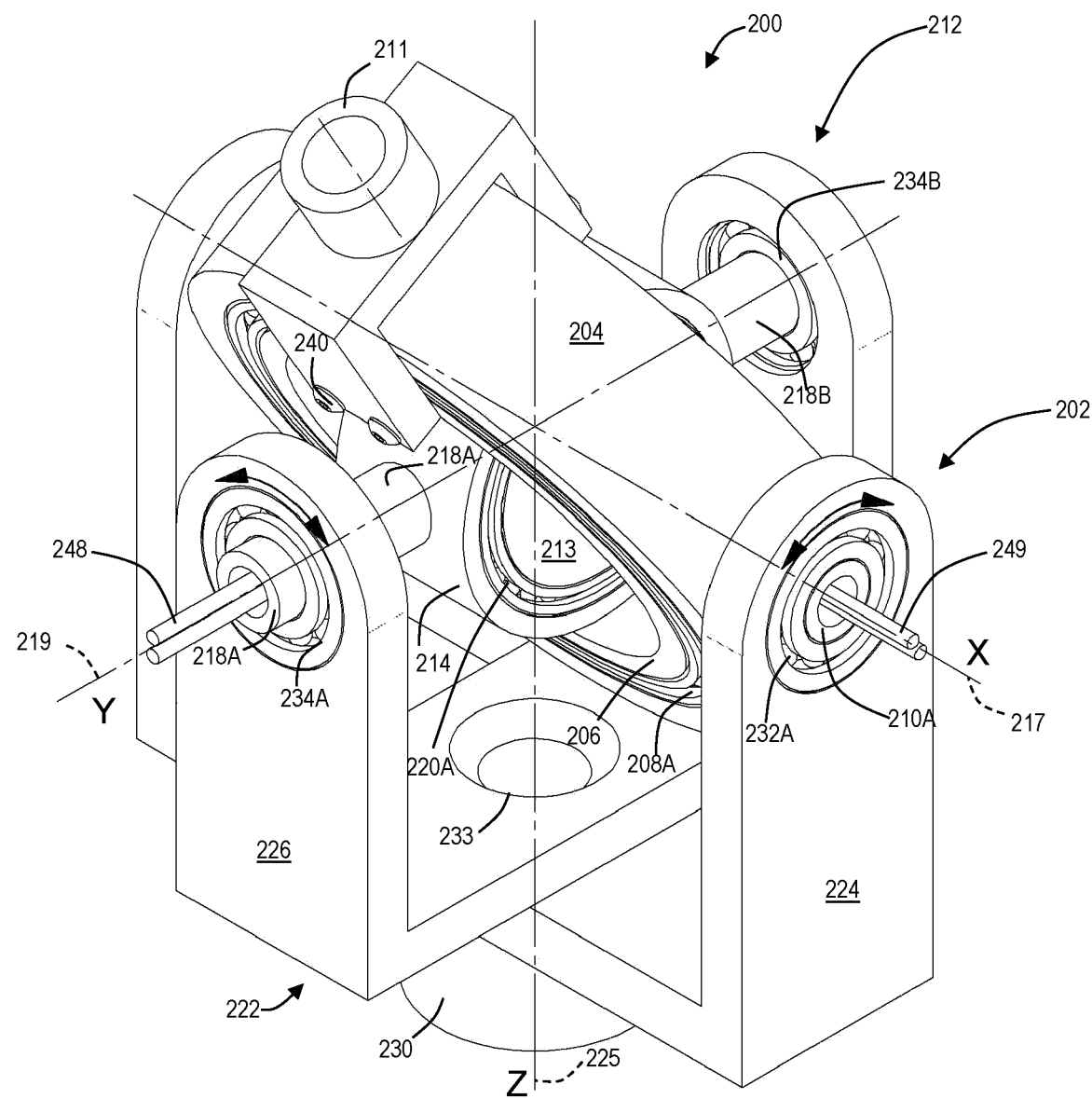
FIG. 18 is an orthogonal view of the gimbal of FIG. 12 rotated about the first axis.
Figure 19:
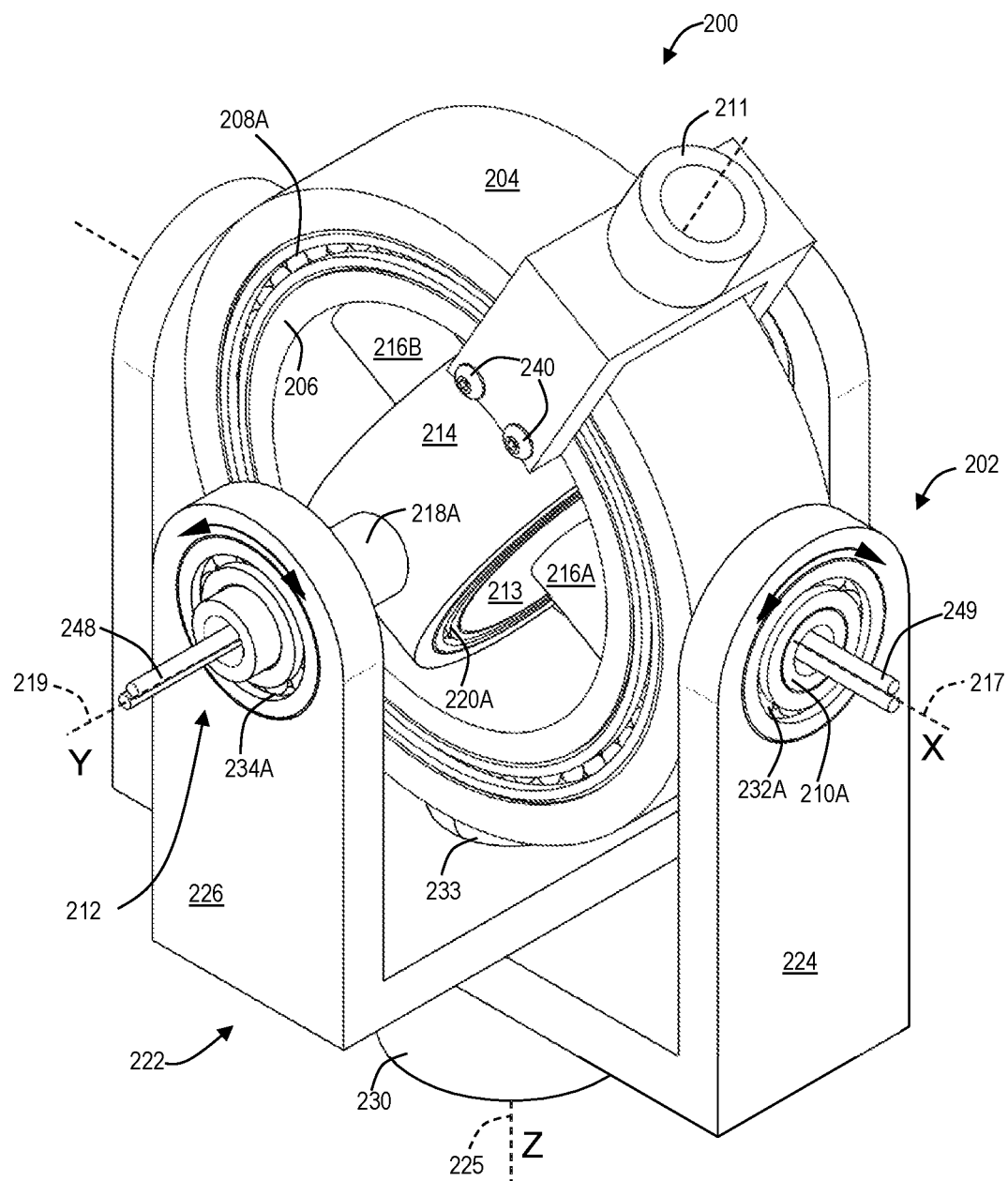
FIG. 19 is an orthogonal view of the gimbal of FIG. 12 rotated about the second axis.
Figure 20:
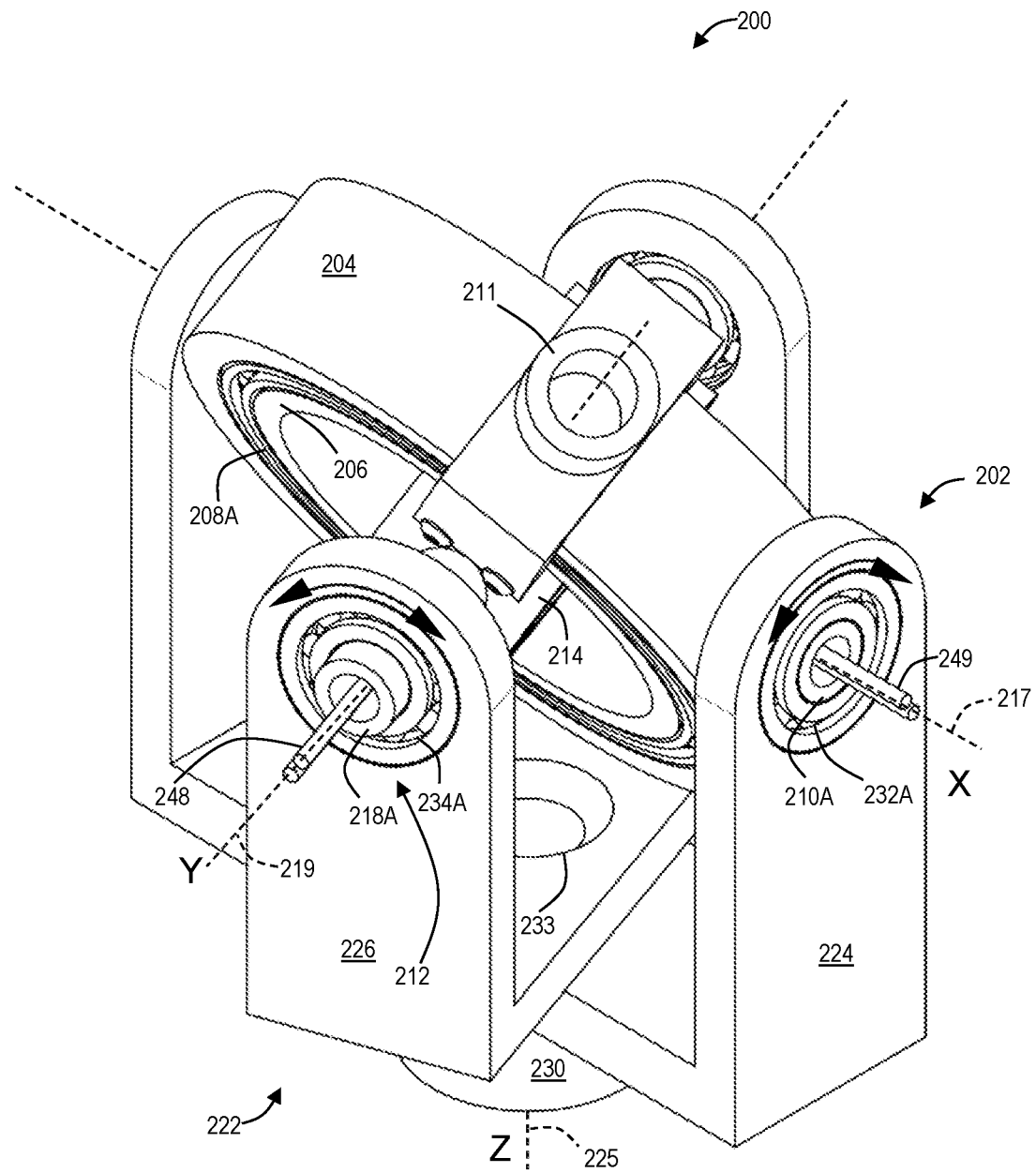
FIG. 20 is an orthogonal view of the gimbal of FIG. 12 in a compound rotation about both the first and second axes.
Figure 21:
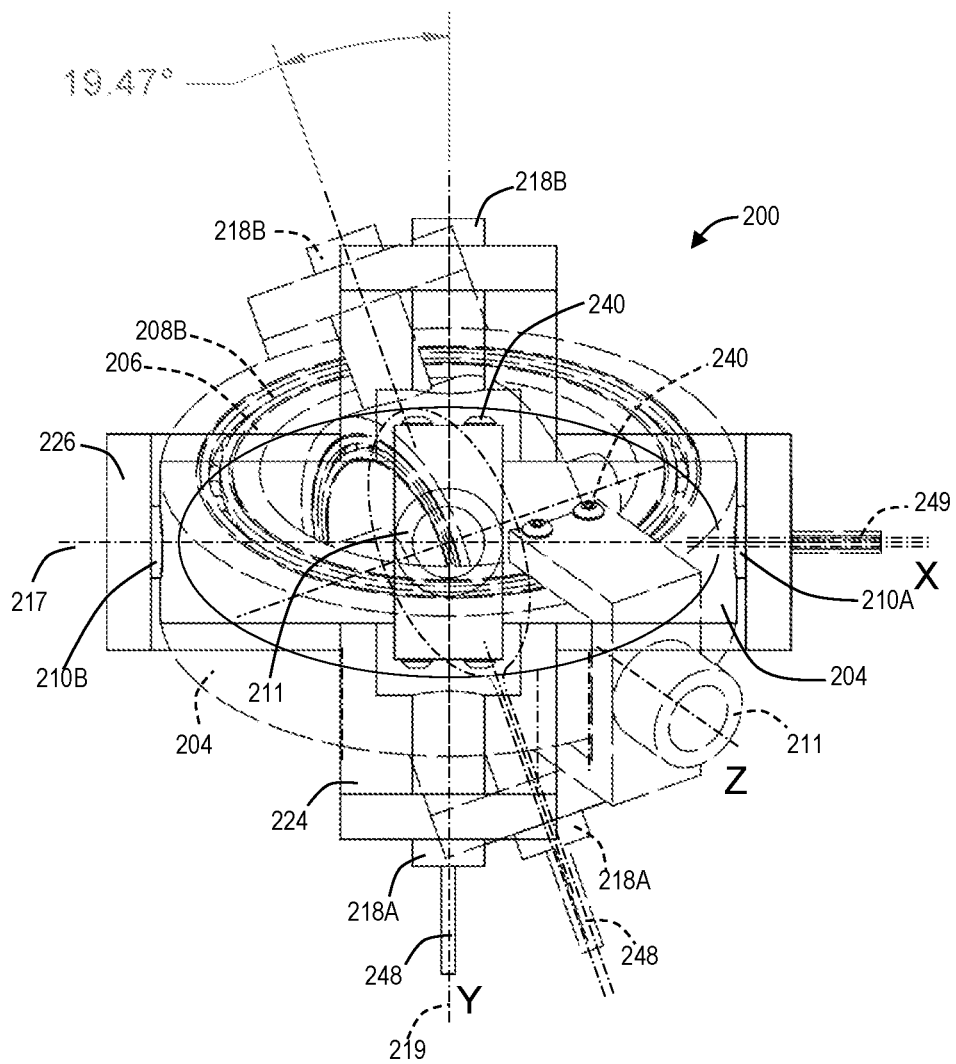
FIG. 21 is a top view of the gimbal of FIG. 12 in two different positions.
Figure 22:
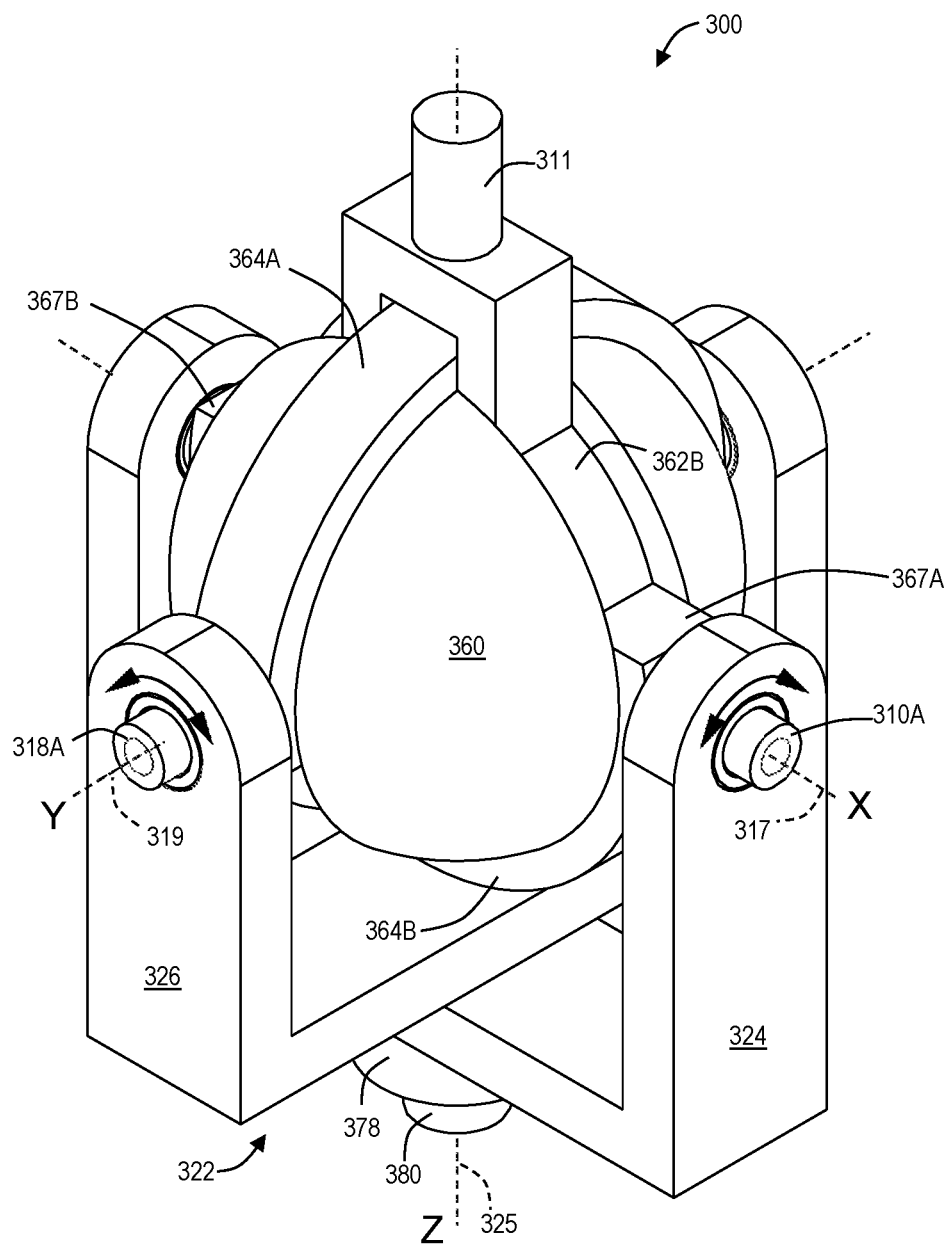
FIG. 22 is an orthogonal view of another illustrative gimbal in accordance with aspects of the present disclosure.

FIGS. 18-21 illustrate the kinematics of the rotating yokes. FIG. 18 depicts gimbal 200 rotated about X axis 217 and FIG. 19 depicts gimbal 200 rotated about Y axis 219. When gimbal 200 is rotated around only one axis (i.e., X or Y), no rotation of yokes 224 and 226 occurs. However, see FIG. 20 where gimbal 200 is rotated about both axis 217 and axis 219. Rotation of gimbal 200 about both axes causes relative rotation between yokes 224 and 226 about axis 225. This scissoring effect decouples axis 217 from axis 219. As actuator arm 211 descends between the two yokes the distance between inner bearing assembly 212 and outer bearing assembly 202 forces yokes 224 and 226 to rotate relative to each other in the same way as described above for mechanical gimbal 100.

C. Illustrative Hydraulic Gimbal

As shown in FIGS. 22-31, this section describes an illustrative hydraulic gimbal 300 in accordance with aspects of the present disclosure.

Figure 23:
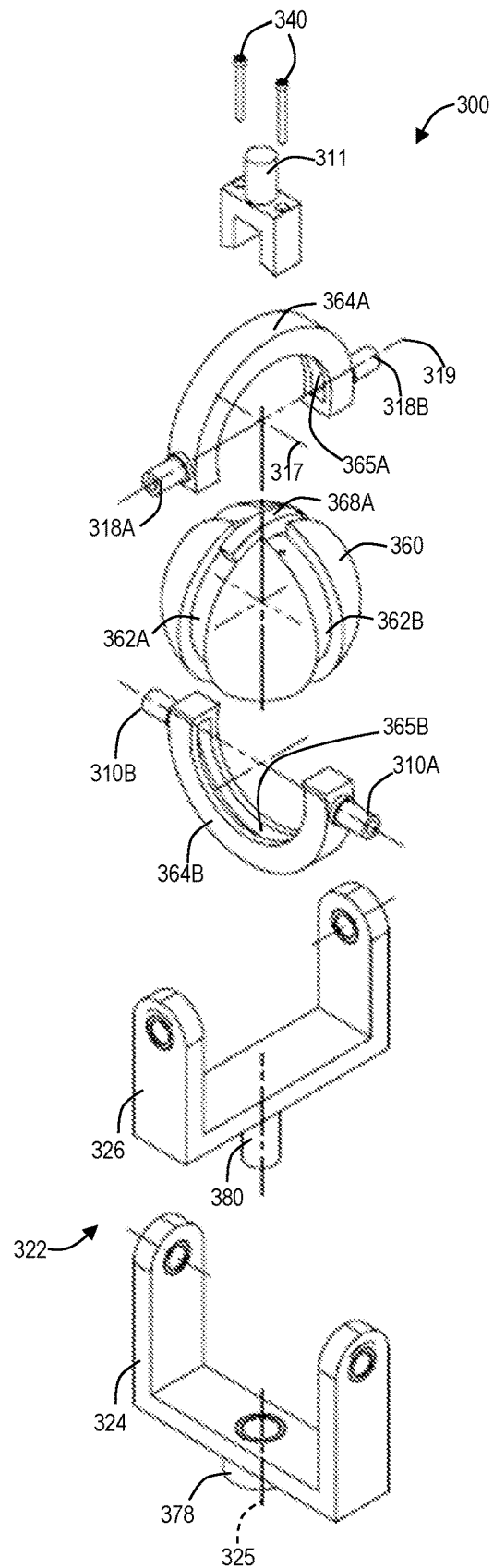
FIG. 23 is an exploded view of the gimbal of FIG. 22.

Hydraulic gimbal 300 includes a sealing band 364B (AKA the first bearing assembly), a sealing band 364A (AKA the second bearing assembly), and a spherical drive portion 360 (AKA the interior member) supported by a housing unit 322 comprising a pair of yokes defining a Z axis 325. FIG. 23 is an exploded view of hydraulic gimbal 300. As shown in FIG. 23, circumferential channels 362A and 362B are formed in the surface of spherical drive portion 360. Channel 362A is oriented in line with a plane defined by Z axis 325 and a Y axis 319 (i.e., the Y-Z plane), and channel 362B is disposed orthogonal to channel 362A, in line with a plane defined by Z axis 325 and an X axis 317 (i.e., the X-Z plane). The channels intersect at the north and south poles of spherical drive portion 360.

Sealing band 364A is disposed within channel 362A, and sealing band 364B is disposed within channel 362B. Sealing bands 364A and 364B are arcuate (i.e., arc-shaped), such that sealing bands 364A and 364B fit into channels 362A and 362B respectively, and are seated therein. Sealing band 364A is disposed primarily in an upper half of channel 362A and sealing band 364B is disposed primarily in a lower half of channel 362B. Hollow interior channels 365A and 365B are formed in sealing bands 364A and 364B, respectively. Attached at terminal ends 366A and 366B of sealing band 364A are trunnions 318A and 318B, and attached at terminal ends 367A and 367B of sealing band 364B are trunnions 310A and 310B. Also disposed within channels 362A and 362B are dividing walls 368A and 368B. Dividing walls 368A and 368B extend vertically from channels 362A and 362B respectively and extend into hollow channels 365A and 365B respectively.

An actuator arm 311 extends radially outward above spherical drive portion 360. Actuator arm 311 is fixed to the spherical drive portion by a U-shaped bridging structure (e.g., using a pair of screws 340), such that actuator arm 311 rotates with spherical drive portion 360. The U-shaped structure extends around sealing band 364A and screws into channel 362B of spherical drive portion 360. Actuator arm 311 has a central cylindrical, tubular, or other-shaped distal end configured to receive a tool or end effector to be positioned or oriented by gimbal 300.

Housing unit 322 includes a first horseshoe-shaped or U-shaped yoke 324 and a second horseshoe-shaped or U-shaped yoke 326 nested within yoke 324. Yoke 324 has a female sleeve 378 and yoke 326 has a male stem member 380 rotatably fitted into female sleeve 378, facilitating free rotation of the yokes relative to each other about Z axis 325. In some examples, rotary bearings are pressed into female sleeve 378 such that the inner diameters of the rotary bearings are pressed onto male stem member 380. Trunnions 318A and 318B of sealing band 364A pivotally attach to distal end portions of the arms of yoke 324 and trunnions 318A and 318B of sealing band 364B pivotally attach to distal end portions of the arms of yoke 326.

Figure 24:
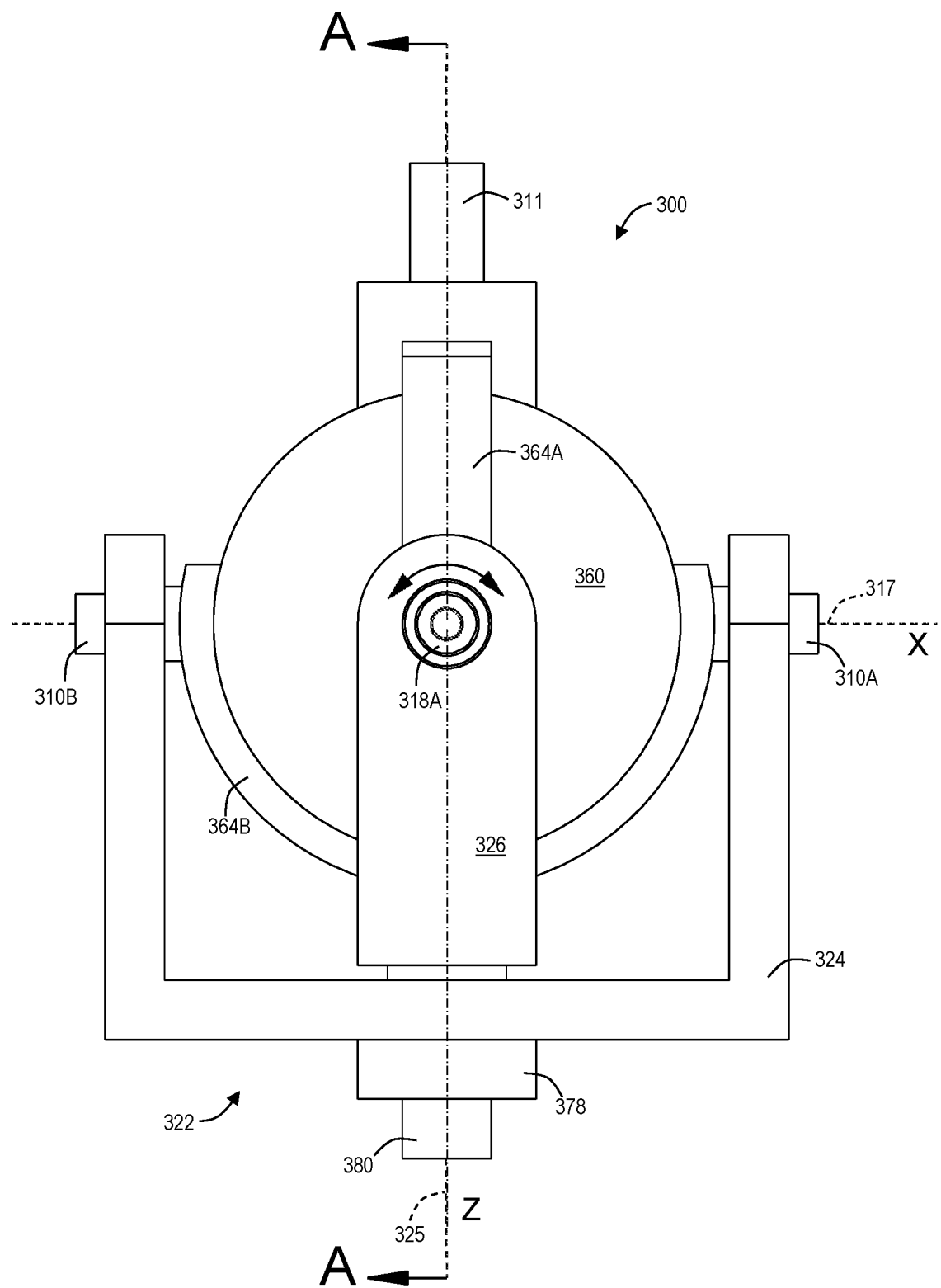
FIG. 24 is a side view of the gimbal of FIG. 22 viewed along a first axis.
Figure 25:
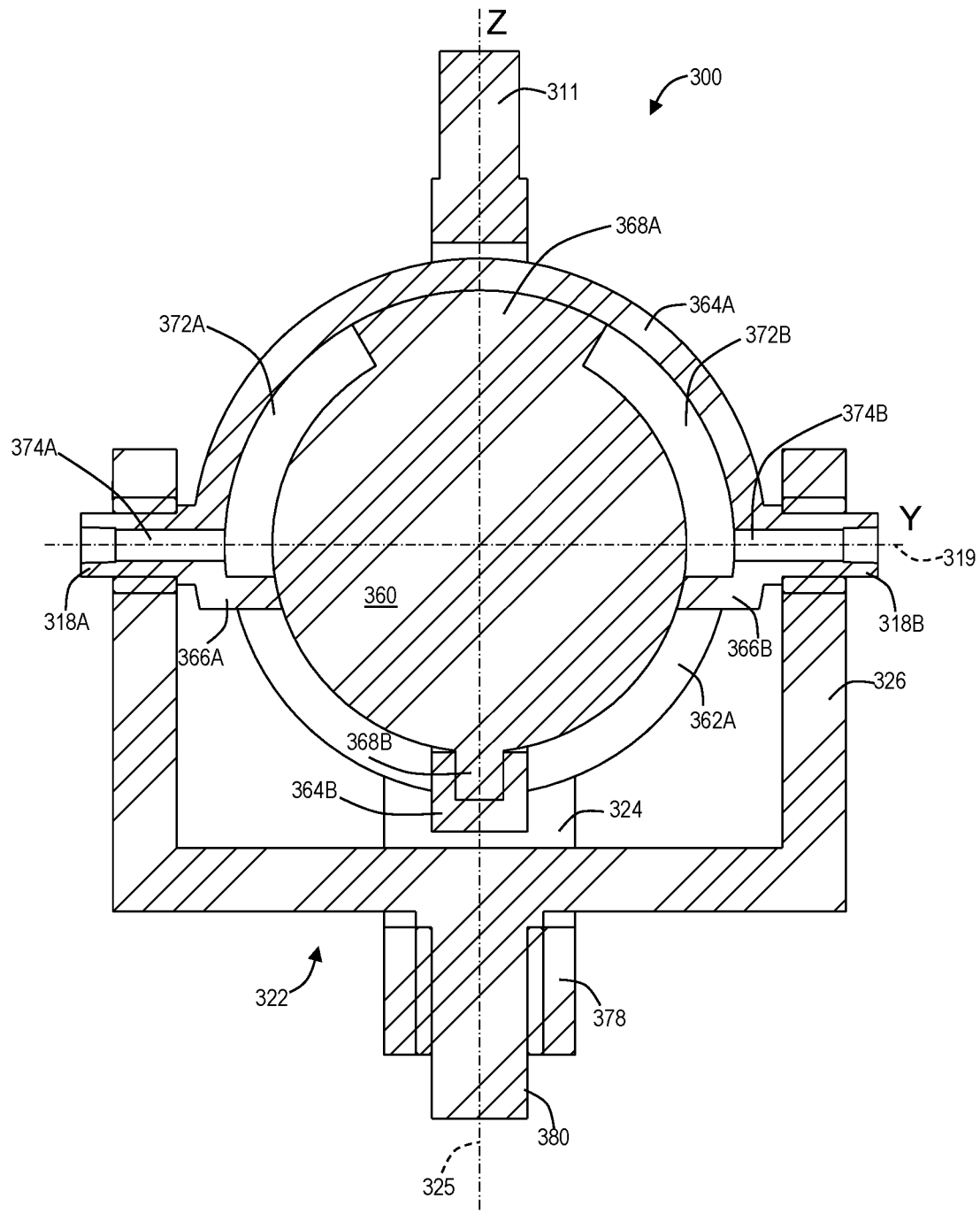
FIG. 25 is a sectional view of the gimbal of FIG. 22 taken at A-A in FIG. 24.

FIG. 25 is a sectional view of hydraulic gimbal 300 taken at A-A in the side view of FIG. 24. Trunnions 318A and 318B of sealing band 364A are hollow and communicate with fluid admission ports 374A and 374B, such that fluid from a pressurized hydraulic supply may be introduced into chambers 372A and 372B through ports 374A and 374B. Chambers 372A and 372B are sections of hollow channel 365A separated by dividing wall 368A. When pressurized fluid is introduced into chamber 372A, dividing wall 368A is forced to rotate to the right (clockwise) in FIG. 25, causing a clockwise (CW) rotation of actuator arm 311 about X axis 317. Pressurized fluid introduced into chamber 372B forces dividing wall 368A to rotate left (counterclockwise) in FIG. 25 causing counterclockwise (CCW) rotation of actuator arm 311 around X axis 317.

Figure 26:
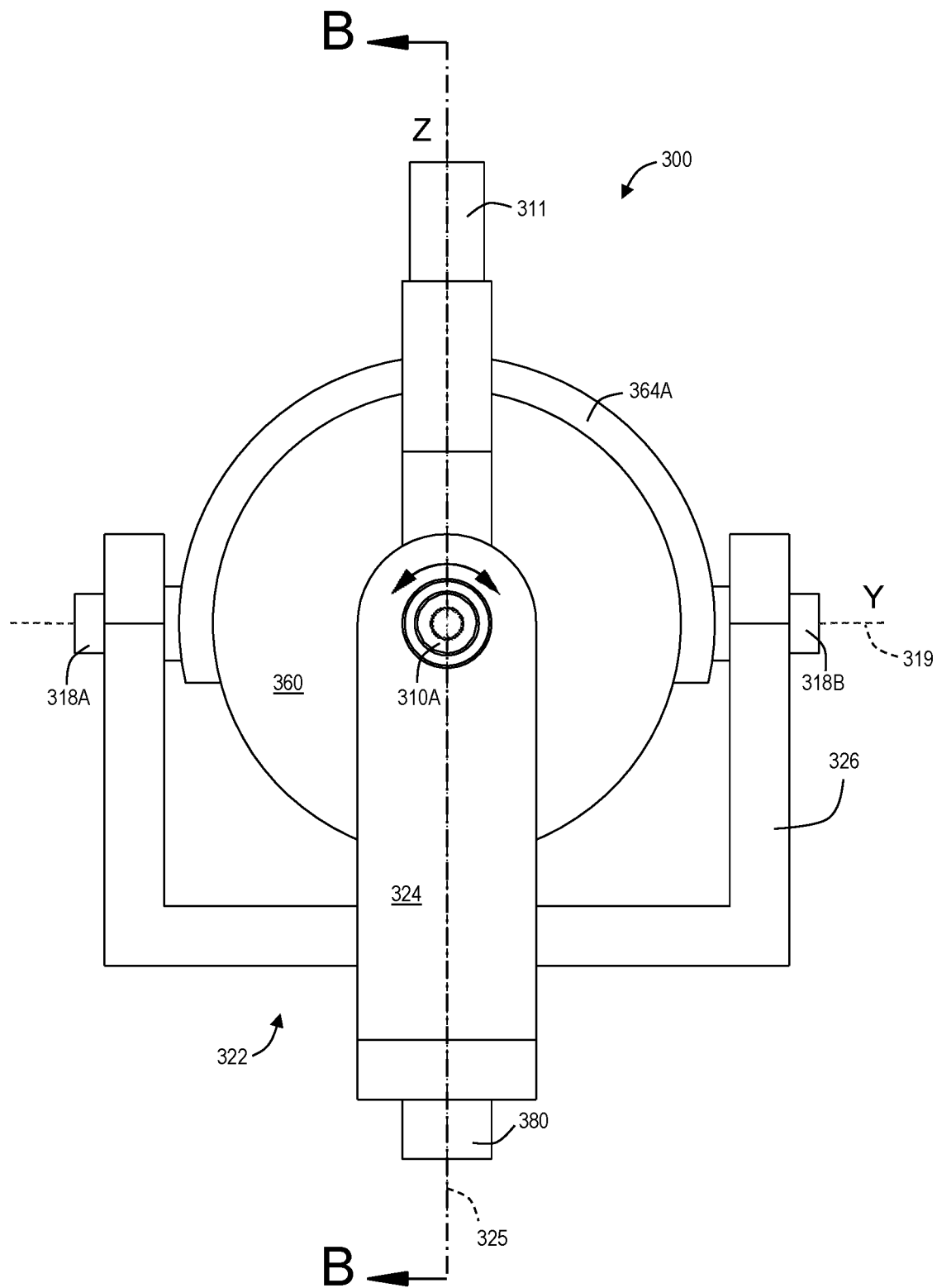
FIG. 26 is a side view of the gimbal of FIG. 22 viewed along a second axis.
Figure 27:
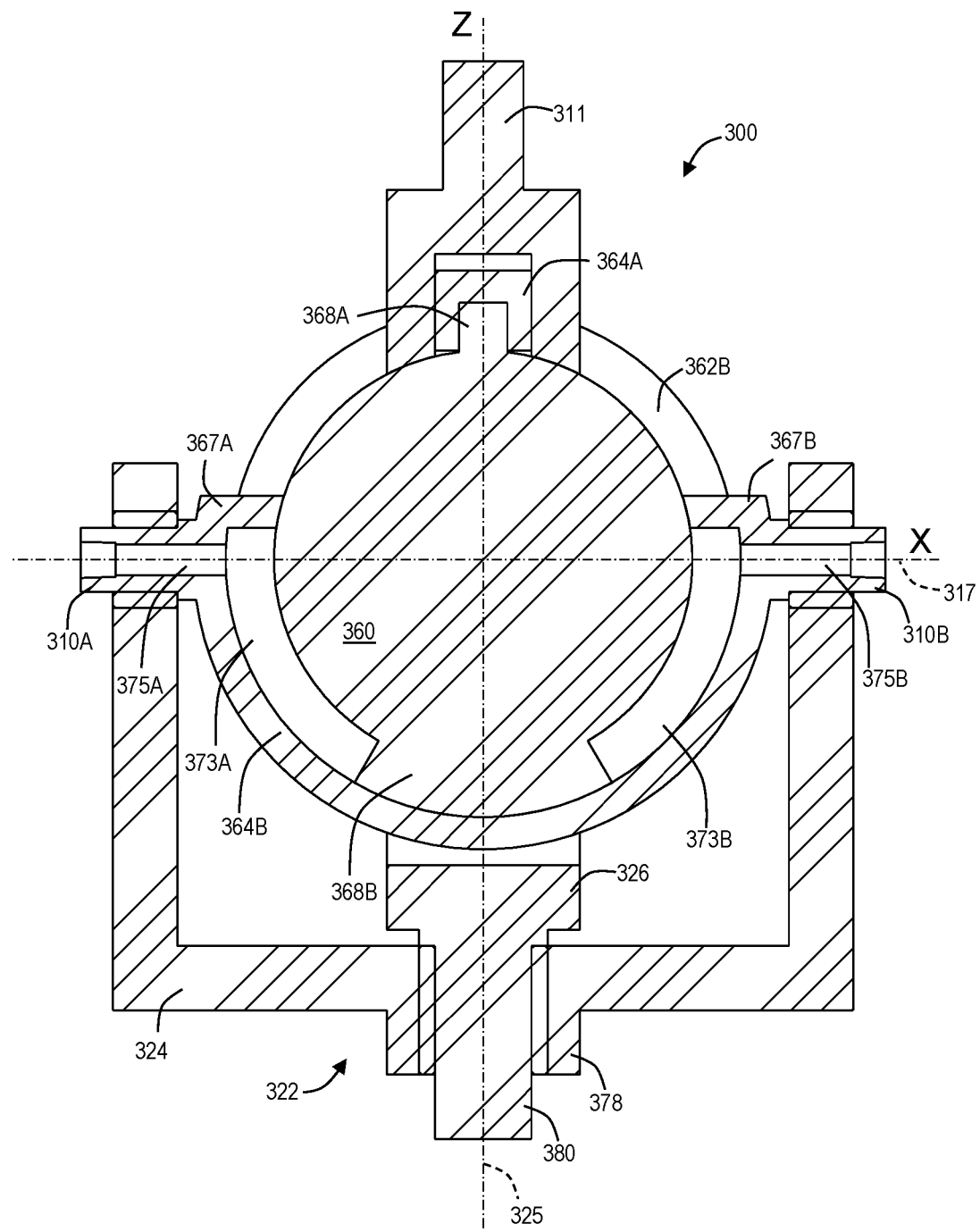
FIG. 27 is a side view of the gimbal of FIG. 22 taken at B-B in FIG. 26.

Similarly, FIG. 27 is a sectional view of hydraulic gimbal 300 taken at B-B in the side view of FIG. 26. The configuration of chambers 373A and 373B, ports 375A and 375B, dividing wall 368B, and sealing band 364B shown in FIG. 27 is similar to that of FIG. 25, except on an opposite side of the spherical drive portion. This configuration facilitates CW and CCW rotation of the actuator arm as described above, but about Y axis 319. The sealing bands are positioned on opposite sides and within perpendicular channels, facilitating manufacturing of the sealing bands with the same size and shape and to positioning at the same radius relative to spherical drive portion 360. Using identical sealing bands, for example, may reduce manufacturing costs and reduce manufacturing/assembly errors.

Figure 28:
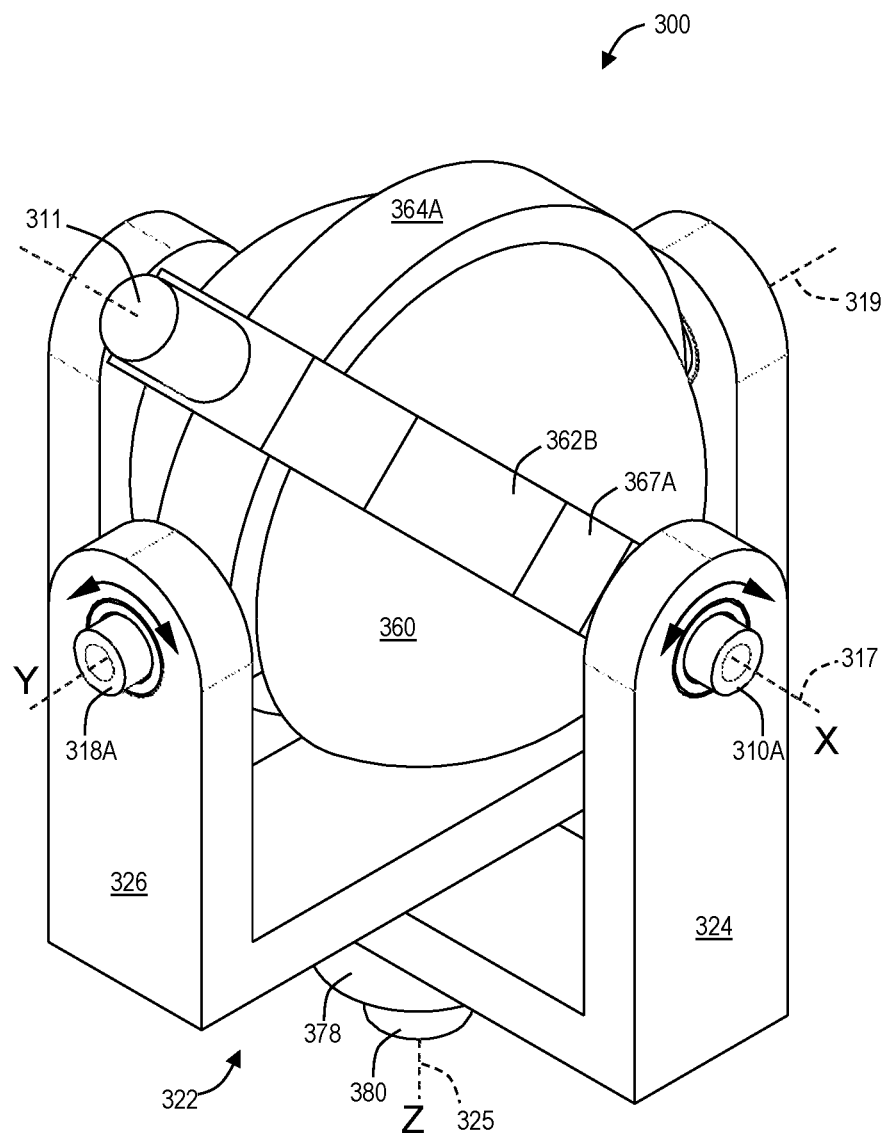
FIG. 28 is an orthogonal view of the gimbal of FIG. 22 rotated about the first axis.
Figure 29:
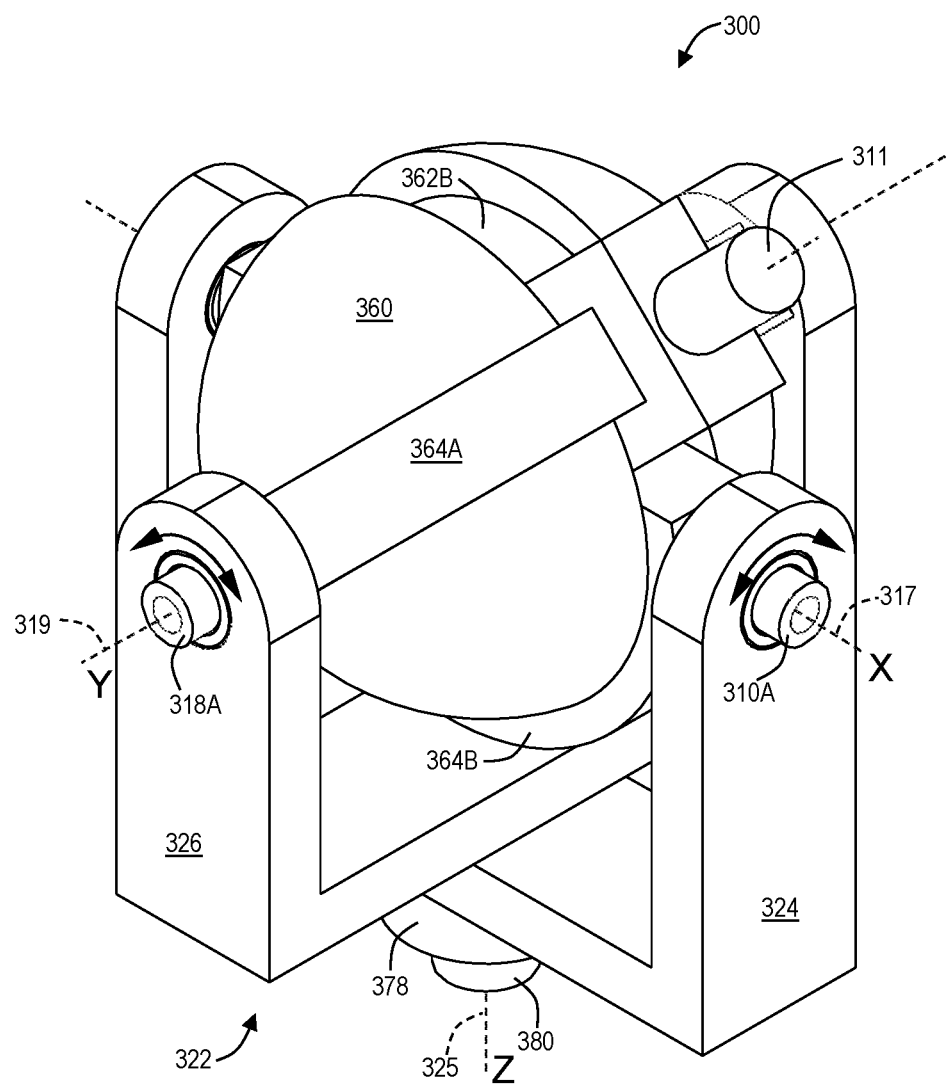
FIG. 29 is an orthogonal view of the gimbal of FIG. 22 rotated about the second axis.
Figure 30:
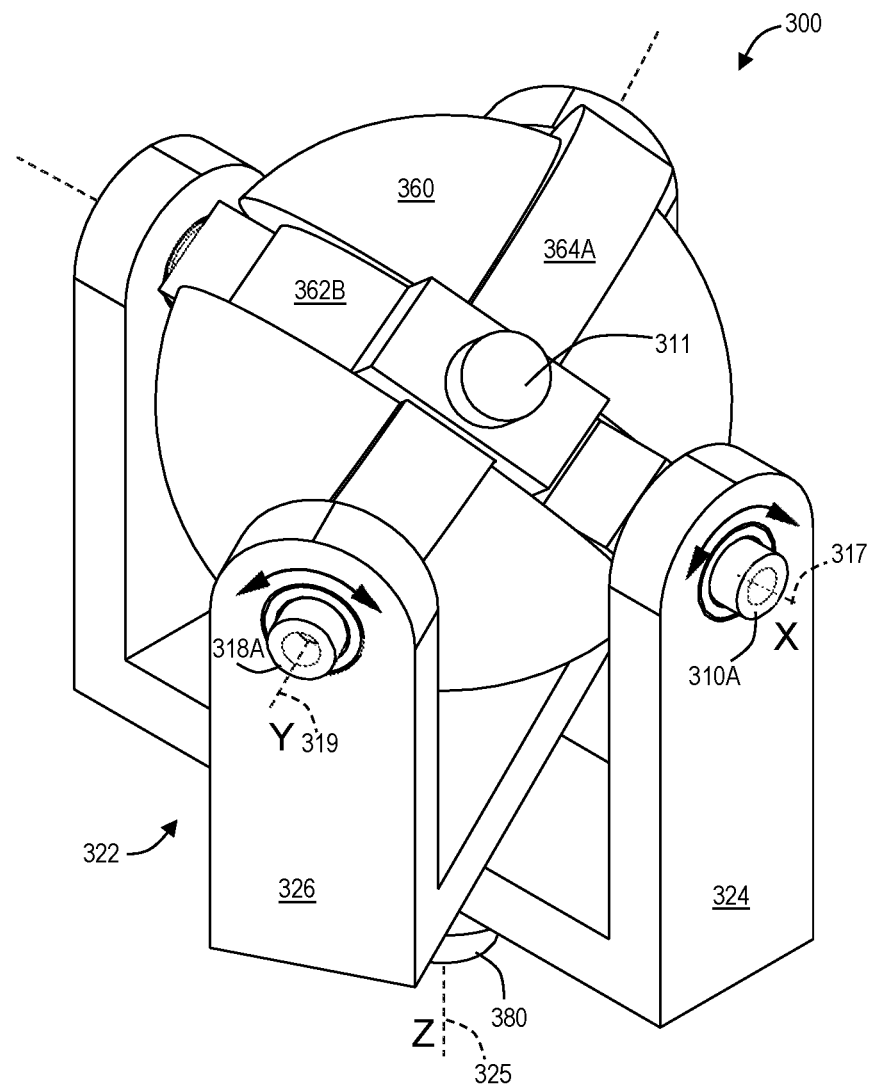
FIG. 30 is an orthogonal view of the gimbal of FIG. 22 in a compound rotation about both the first and second axes.
Figure 31:
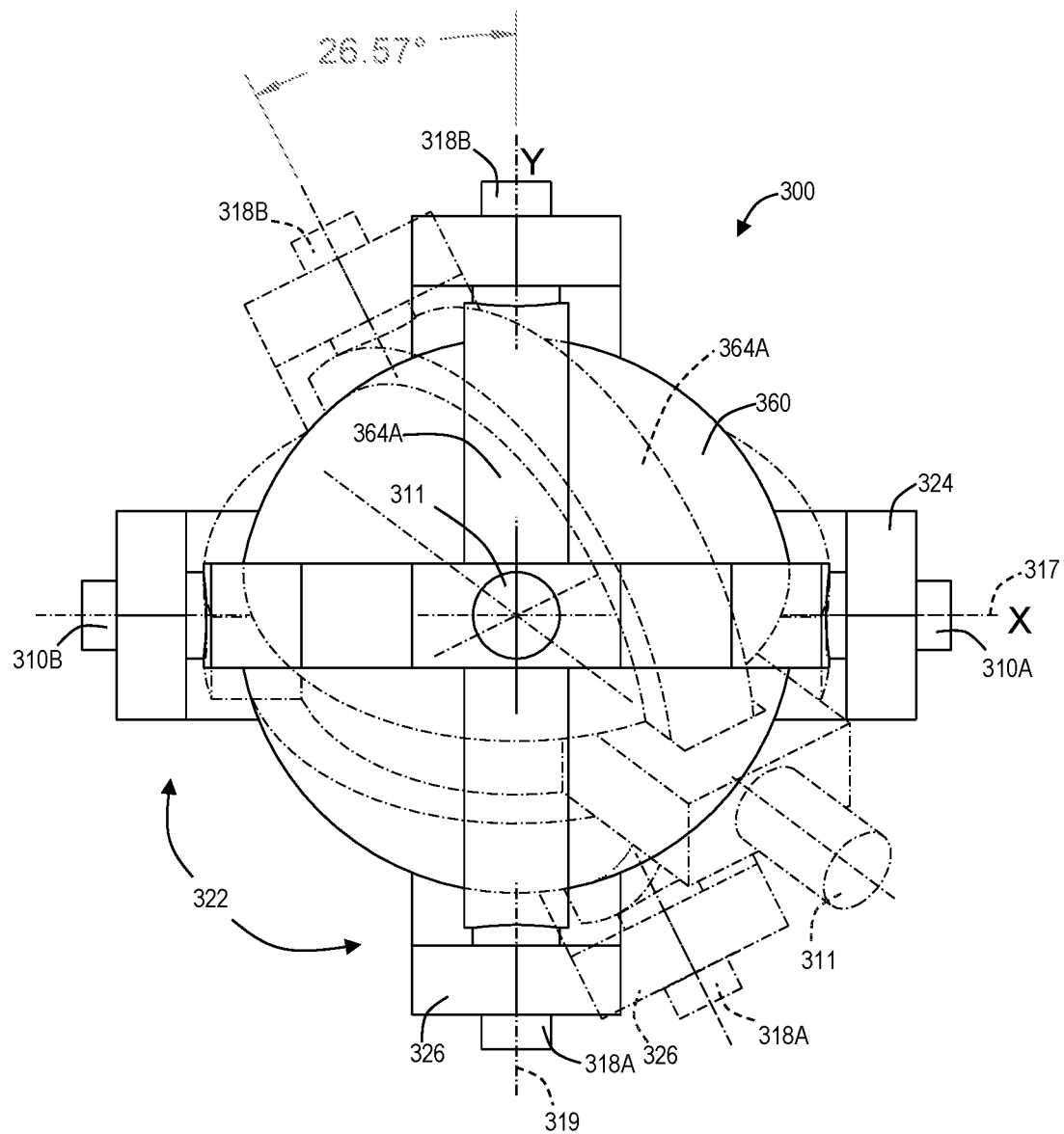
FIG. 31 is a top view of the gimbal of FIG. 22 in two different positions.

As depicted in FIG. 28 and FIG. 29, there is no relative rotation of the yokes when rotation about a single axis (X or Y) occurs. However, in FIG. 30 where actuator arm 311 is rotated about both X axis 317 and Y axis 319, yoke 326 rotates counterclockwise to accommodate the change in distance between the trunnions. Thus, the yokes allow at least two of the trunnions to slide sideways and accommodate this change in distance. FIG. 31 further illustrates the CCW rotation of yoke 326 by showing the gimbal in two different superimposed positions from a top view.

At least two perpendicular trunnions rotate about axis 325 to permit full freedom of rotation of actuator arm 311. As actuator arm 311 rotates in and out of the plane of the drawing in FIG. 30 the distance varies between the trunnions, as measured about the circumference in an imaginary plane defined by the four trunnions. Thus, yokes 324 and 326 are pivotally attached to the trunnions and rotate relative to each other to accommodate the change in distance between the trunnions. In some examples, gimbal 300 may be rotated about Z axis 325 as a whole, via female sleeve 378 (AKA the central support shaft).

D. Illustrative Combinations and Additional Examples

This section describes additional aspects and features of gimbal assemblies, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A gimbal, comprising:
- a U-shaped, stationary outer yoke including a first pair of arms having opposing distal end portions defining an X axis;
- a U-shaped, rotatable inner yoke including a second pair of arms having opposing distal end portions defining a Y axis, the inner yoke being rotatable with respect to the outer yoke about a Z axis oriented perpendicular to the X axis and to the Y axis;
- a first bearing assembly rotatably coupled to the distal end portions of the first pair of arms of the stationary outer yoke, such that the first bearing assembly is rotatable about the X axis;
- a second bearing assembly rotatably coupled to the distal end portions of the second pair of arms of the rotatable inner yoke, such that the second bearing assembly is rotatable about the Y axis; and
- a mechanical interface rotatably coupled to the first bearing assembly and to the second bearing assembly.

A1. The gimbal of A0, further comprising a mounting arm coupled to the mechanical interface, such that the mounting arm is configured to be selectively pointed by the gimbal.

A2a. The gimbal of A1, wherein the mounting arm includes a bridging structure configured to avoid interference with the first and second bearing assemblies, such that the mounting arm extends radially from the gimbal.

A2b. The gimbal of A1, wherein the mounting arm passes through a slot in the first bearing assembly, such that the mounting arm extends radially from the gimbal.

A3. The gimbal of A0, further comprising a first actuator configured to selectively rotate the first bearing assembly about the X axis.

A4. The gimbal of A0, further comprising a second actuator configured to selectively rotate the second bearing assembly about the Y axis.

A5. The gimbal of A0, wherein the first bearing assembly comprises a first ring coupled to the first yoke by X-axis trunnions, the second bearing assembly comprises a second ring coupled to the second yoke by Y-axis trunnions, and a third ring nested concentrically within the first ring is rotatable about the Y axis relative to the first ring; and
- wherein the second ring is rotatably coupled to the third ring by a pair of pivot pins coaxial with the X-axis trunnions.

A6. The gimbal of A5, further comprising a first gear fixed to a first one of the X-axis trunnions, such that the first gear is configured to be selectively driven to rotate the first bearing assembly about the X axis.

A7. The gimbal of A5, further comprising a second gear fixed to a first one of the Y-axis trunnions, such that the second gear is configured to be selectively driven to rotate the second bearing assembly about the Y axis.

A8. The gimbal of A0, wherein the first bearing assembly comprises a first ring coupled to the first yoke by X-axis trunnions, the second bearing assembly comprises a second ring coupled to the second yoke by Y-axis trunnions, and a third ring is nested concentrically within the first ring and rotatable about the Y axis relative to the first ring; and wherein the second ring is rotatably coupled to the third ring by an inner bearing of the second ring surrounding a transverse axle fixed on either end to an inner wall of the third ring.

A9. The gimbal of A8, wherein a first electric motor is integrated into the first bearing assembly and configured to selectively rotate the third ring relative to the first ring (and therefore the second about the Y axis).

A10. The gimbal of A8, wherein a second electric motor is integrated into the second bearing assembly and configured to selectively rotate the third ring relative to the second ring (and therefore the first about the X axis).

A11. The gimbal of A0, wherein the first bearing assembly comprises a first arcuate structure coupled to the first yoke by X-axis trunnions, the second bearing assembly comprises a second arcuate structure coupled to the second yoke by Y-axis trunnions, and the mechanical interface comprises a spherical structure having a first circumferential channel and an orthogonal second circumferential channel; and wherein the first arcuate structure is slidingly engaged with the first circumferential channel, and the second arcuate structure is slidingly engaged with the second circumferential channel.

A12. The gimbal of A11, wherein the first arcuate structure comprises an inner channel configured to receive pressurized hydraulic fluid, and the first circumferential channel comprises a first dividing wall configured to be acted upon by the hydraulic fluid to rotate the spherical structure about the Y axis.

A13. The gimbal of A11, wherein the second arcuate structure comprises an inner channel configured to receive pressurized hydraulic fluid, and the second circumferential channel comprises a second dividing wall configured to be acted upon by the hydraulic fluid to rotate the spherical structure about the X axis.

B0. A gimbal, comprising:
a U-shaped, stationary outer yoke including a first pair of arms having opposing distal end portions defining an X axis;
a U-shaped, rotatable inner yoke including a second pair of arms having opposing distal end portions defining a Y axis, the inner yoke being rotatable with respect to the outer yoke about a Z axis oriented perpendicular to the X axis and to the Y axis;
a first bearing assembly rotatably coupled to the distal end portions of the first pair of arms of the stationary outer yoke, such that the first bearing assembly is rotatable about the X axis;
a second bearing assembly rotatably coupled to the distal end portions of the second pair of arms of the rotatable inner yoke, such that the second bearing assembly is rotatable about the Y axis; and
a third bearing assembly rotatably coupled to the first bearing assembly and rotatably coupled to the second bearing assembly, such that the third bearing assembly is rotatable about the Y axis and the X axis;
wherein a mounting arm is fixed to the third bearing assembly, such that the mounting arm protrudes from the gimbal.

B1. The gimbal of B0, wherein the mounting arm extends radially outward and is configured to be selectively pointed by the gimbal.

B2. The gimbal of B1, wherein the mounting arm extends radially outward from the third bearing assembly and includes a bridging portion configured to mechanically bypass the first bearing assembly.

B3. The gimbal of B0, further comprising a first actuator configured to selectively rotate the first bearing assembly about the X axis.

B4. The gimbal of B0, further comprising a second actuator configured to selectively rotate the second bearing assembly about the Y axis.

B5. The gimbal of B0, wherein the rotatable inner yoke automatically and freely rotates with respect to the stationary outer yoke when the first bearing assembly is rotated about the X axis while the second bearing assembly is rotated about the Y axis.

B6. The gimbal of B0, further comprising an open passage extending from a base of the outer yoke to a distal end of the mounting arm.

B7. The gimbal of B6, wherein the open passage includes:
a tubular portion formed by the inner and outer yokes;
a lower slot of the first bearing assembly;
a lower aperture of the third bearing assembly;
a central aperture formed by a ring of the second bearing assembly;
an upper aperture of the third bearing assembly;
an upper slot of the first bearing assembly; and
a tubular portion of the mounting arm.

B8. The gimbal of B0, wherein the first bearing assembly comprises a first ring coupled to the first yoke by X-axis trunnions, the second bearing assembly comprises a second ring coupled to the second yoke by Y-axis trunnions, and the third bearing assembly comprises a third ring nested concentrically within the first ring and rotatable about the Y axis relative to the first ring; and wherein the second ring is rotatably coupled to the third ring by a pair of pivot pins coaxial with the X-axis trunnions.

B9. The gimbal of B8, further comprising a first gear fixed to a first one of the X-axis trunnions, such that the first gear is configured to be selectively driven to rotate the first bearing assembly about the X axis.

B10. The gimbal of B9, further comprising a second gear fixed to a first one of the Y-axis trunnions, such that the second gear is configured to be selectively driven to rotate the second bearing assembly about the Y axis.

B11. The gimbal of B0, wherein the first bearing assembly comprises a first ring coupled to the first yoke by X-axis trunnions, the second bearing assembly comprises a second ring coupled to the second yoke by Y-axis trunnions, and the third bearing assembly comprises a third ring nested concentrically within the first ring and rotatable about the Y axis relative to the first ring; and wherein the second ring is rotatably coupled to the third ring by an inner bearing of the second ring surrounding a transverse axle fixed on either end to an inner wall of the third ring.

B12. The gimbal of B11, wherein a first electric motor is integrated into the first bearing assembly and configured to selectively rotate the third ring relative to the first ring. (and therefore the second about the Y axis)

B13. The gimbal of B11, wherein a second electric motor is integrated into the second bearing assembly and configured to selectively rotate the third ring relative to the second ring. (and therefore the first about the X axis)

B14. The gimbal of B0, wherein the first bearing assembly comprises a first arcuate structure coupled to the first yoke by X-axis trunnions, the second bearing assembly comprises a second arcuate structure coupled to the second yoke by Y-axis trunnions, and the third bearing assembly comprises a spherical structure having a first circumferential channel and an orthogonal second circumferential channel; and wherein the first arcuate structure is slidingly engaged with the first circumferential channel, and the second arcuate structure is slidingly engaged with the second circumferential channel.

B15. The gimbal of B14, wherein the first arcuate structure comprises an inner channel configured to receive pressurized hydraulic fluid, and the first circumferential channel comprises a first dividing wall configured to be acted upon by the hydraulic fluid to rotate the spherical structure about the Y axis.

B16. The gimbal of B14, wherein the second arcuate structure comprises an inner channel configured to receive pressurized hydraulic fluid, and the second circumferential channel comprises a second dividing wall configured to be acted upon by the hydraulic fluid to rotate the spherical structure about the X axis.

C0. A gimbal, comprising:
an outer yoke and an inner yoke coaxially mounted with respect to a Z axis;
a first bearing assembly held by the outer yoke and rotatable about an X axis; and
a second bearing assembly held by the inner yoke and rotatable about a Y axis;
wherein the first and second bearing assemblies are coupled to each other by an interior member rotatably connected to both the first and the second bearing assemblies; and
wherein the inner yoke is rotatable about the Z axis with respect to the outer yoke, such that the X axis is decoupled from the Y axis.

C1. The gimbal of C0, wherein the outer yoke is stationary.

C2. The gimbal of C1, wherein the inner yoke automatically and freely rotates with respect to the outer yoke when the first bearing assembly is rotated about the X axis while the second bearing assembly is rotated about the Y axis.

C3. The gimbal of C0, wherein the interior member is rotatably coupled to the first bearing assembly such that the interior member is rotatable about the Y axis and rotatably coupled to the second bearing assembly such that the interior member is rotatable about the X axis.

C4. The gimbal of C0, wherein a mounting arm is fixed to the interior member, such that the gimbal is configured to selectively orient the mounting arm.

Advantages, Features, and Benefits

The different embodiments and examples of the gimbal described herein provide several advantages over known solutions. For example, illustrative embodiments and examples described herein have a housing unit comprising coaxially mounted yokes capable of relative rotation with respect to each other. Using yokes capable of relative rotation with respect to each other to house the gimbal improves the precision of the movement of the gimbal. The housing unit is also cost effective and does not require heavy parts.

Additionally, and among other benefits, illustrative embodiments and examples described herein have a hollow tube extending from the housing unit through the gimbal to the actuator arm. The hollow tube allows for the passage of electrical cables for embodiments of the present invention including electric motors to power the gimbal.

Additionally, and among other benefits, illustrative embodiments and examples described herein allow a variety of different drivers and power sources to be used to drive the rotation of the gimbal. For example, the gimbal may be driven hydraulically.

Additionally, and among other benefits, illustrative embodiments and examples described herein provide both pitch and yaw rotation of a spherical drive portion while using sealing bands identical in shape and size. Using sealing bands of identical shape and size may reduce the cost of manufacturing.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A gimbal, comprising: an outer yoke and an inner yoke coaxially mounted with respect to a Z axis; a first bearing assembly held by the outer yoke and rotatable about an X axis; and a second bearing assembly held by the inner yoke and rotatable about a Y axis; wherein the first and second bearing assemblies are coupled to each other through an
interior member rotatably connected to both the first and the second bearing assemblies;
wherein the inner yoke is rotatable about the Z axis with respect to the outer yoke, such that the X axis is decoupled from the Y axis; wherein
the outer yoke is stationary; and
wherein the inner yoke automatically and freely rotates with respect to the outer yoke when the first bearing assembly is rotated about the X axis while the second bearing assembly is rotated about the Y axis.

2. A gimbal, comprising:
a U-shaped, stationary first yoke including a first pair of arms having opposing distal end portions defining an X axis; a U-shaped, rotatable second yoke including a second pair
of arms having opposing
distal end portions defining a Y axis, the second yoke being rotatable with respect to the first yoke about a Z axis oriented perpendicular to the X axis and to the Y axis; a first bearing assembly rotatably coupled to the distal end portions of the first pair of
arms of the stationary first yoke, such that the first bearing assembly is rotatable about the X axis;
a second bearing assembly rotatably coupled to the distal end portions of the second pair of arms of the rotatable second yoke, such that the second bearing assembly is rotatable about the Y axis; and a third bearing assembly having a first mechanical interface rotatably coupled to the
first bearing assembly and a second mechanical interface rotatably coupled to the second bearing assembly, such that the third bearing assembly is rotatable about the Y axis and the X axis.

3. The gimbal of claim 2, further comprising a mounting arm fixed to the third bearing assembly, such that the mounting arm is configured to be selectively pointed by the gimbal.

4. The gimbal of claim 3, wherein the mounting arm includes a bridging structure configured to avoid interference with the first and second bearing assemblies, such that the mounting arm extends radially from the gimbal.

5. The gimbal of claim 2, further comprising a first actuator configured to selectively rotate the first bearing assembly about the X axis, and a second actuator configured to selectively rotate the second bearing assembly about the Y axis.

6. The gimbal of claim 2, wherein the first bearing assembly comprises a first ring coupled to the first yoke by X-axis trunnions, the second bearing assembly comprises a second ring coupled to the second yoke by Y-axis trunnions, and the third bearing assembly comprises a third ring nested concentrically within the first ring and rotatable about the Y axis relative to the first ring; and wherein the second ring is rotatably coupled to the third ring by a pair of pivot pins coaxial with the X-axis trunnions.

7. The gimbal of claim 2, wherein the first bearing assembly comprises a first ring coupled to the first yoke by X-axis trunnions, the second bearing assembly comprises a second ring coupled to the second yoke by Y-axis trunnions, and the third bearing assembly comprises a third ring nested concentrically within the first ring and rotatable about the Y axis relative to the first ring; and wherein the second ring is rotatably coupled to the third ring by an inner bearing of the second ring surrounding a transverse axle fixed on either end to an inner wall of the third ring.

8. The gimbal of claim 2, wherein the first bearing assembly comprises a first arcuate structure coupled to the first yoke by X-axis trunnions, the second bearing assembly comprises a second arcuate structure coupled to the second yoke by Y-axis trunnions, and the third bearing assembly comprises a spherical structure having a first circumferential channel and an orthogonal second circumferential channel; and wherein the first arcuate structure is slidingly engaged with the first circumferential
channel, and the second arcuate structure is slidingly engaged with the second circumferential channel.

9. A gimbal, comprising:
a U-shaped, stationary outer yoke including a first pair of arms having opposing distal end portions defining an X axis; a U-shaped, rotatable inner yoke including a second pair of arms having opposing distal
end portions defining a Y axis, the inner yoke being rotatable with respect to the outer yoke about a Z axis oriented perpendicular to the X axis and to the Y axis; a first bearing assembly rotatably coupled to the distal end portions of the first pair of
arms of the stationary outer yoke, such that the first bearing assembly is rotatable about the X axis;
a second bearing assembly rotatably coupled to the distal end portions of the second pair of arms of the rotatable inner yoke, such that the second bearing assembly is rotatable about the Y axis; and a third bearing assembly rotatably coupled to both the first bearing assembly and the
second bearing assembly, such that the third bearing assembly is rotatable about the Y axis and the X axis;
wherein a mounting arm is fixed to the third bearing assembly, such that the mounting arm protrudes from the gimbal.

10. The gimbal of claim 9, wherein the mounting arm extends radially outward and is configured to be selectively pointed by the gimbal.

11. The gimbal of claim 9, further comprising a first actuator configured to selectively rotate the first bearing assembly about the X axis, and a second actuator configured to selectively rotate the second bearing assembly about the Y axis.

12. The gimbal of claim 9, wherein the rotatable inner yoke automatically and freely rotates with respect to the stationary outer yoke when the first bearing assembly is rotated about the X axis while the second bearing assembly is rotated about the Y axis.

13. The gimbal of claim 9, further comprising an open passage extending from a base of the outer yoke to a distal end of the mounting arm.

14. The gimbal of claim 9, wherein the first bearing assembly comprises a first ring coupled to the outer yoke by X-axis trunnions, the second bearing assembly comprises a second ring coupled to the inner yoke by Y-axis trunnions, and the third bearing assembly comprises a third ring nested concentrically within the first ring and rotatable about the Y axis relative to the first ring; and wherein the second ring is rotatably coupled to the third ring by an inner bearing of the second ring surrounding a transverse axle fixed on either end to an inner wall of the third ring.

15. The gimbal of claim 14, including a first electric motor configured to selectively rotate the third ring relative to the first ring.

16. The gimbal of claim 14, including a second electric motor configured to selectively rotate the third ring relative to the second ring.

* * * * *